United States Patent [19]

Kendy et al.

[11] 3,892,466

[45] July 1, 1975

[54] LASER-SIGHT AND COMPUTER FOR ANTI-AIRCRAFT GUN FIRE CONTROL SYSTEM

[75] Inventors: Leonard Kendy, Palos Verdes Peninsula; Richard L. Frey, Los Angeles, both of Calif.

[73] Assignee: Hughes Aircraft Company, Culver City, Calif.

[22] Filed: July 12, 1974

[21] Appl. No.: 488,086

Related U.S. Application Data

[62] Division of Ser. No. 209,268, Dec. 17, 1971, Pat. No. 3,845,276.

[52] U.S. Cl. ...................... 350/10; 350/34; 350/35; 350/20; 356/255

[51] Int. Cl.$^2$ .................... G02B 27/32; G02B 23/04

[58] Field of Search .................... 350/10, 20, 33–35; 356/3–5, 247, 253–255

[56] References Cited

UNITED STATES PATENTS 3,503,318 3/1970 De La Cierva .................. 350/20 X

*Primary Examiner*—David H. Rubin
*Attorney, Agent, or Firm*—Paul H. Ware; W. H. MacAllister

[57] ABSTRACT

A gun fire control system for pointing a gun at rapidly moving targets such as an aircraft is disclosed. The system comprises a vibration isolated control unit including a gunner's sight assembly which is provided with line of sight indicating instrumentation and uses common optical elements both for visual sighting by the gunner to generate manual acquisition commands and for a continuously operable laser transmitter-receiver rangefinder. The control unit also includes a solid state hybrid computer for providing continuous implicit separate solutions of lead angle equations and aided tracking equations respectively, and for generating commands for directing the fire of the gun in response to signals derived from solution of appropriate lead angle equations, and supplied to gun servos. The computer uses signals derived from the rangefinder in its automatic tracking aid circuits to generate commands to the sight assembly, but the gunner retains override and trim capability over these commands. Measurement of the velocity vector of the moving target is made in a moving coordinate system having one of its three mutually orthogonal axes always lying along the line of sight from the gunner to the target. The measured vector components of target velocity expressed in this first moving coordinate system are then transformed to quantities expressed in a second inertial coordinate system having its origin at the position of the gun and the observer and one axis lying along the local gravitational vector in order to generate the appropriate tracking aid commands and to afford a more accurate basis for the real time continuous solution of the three simultaneous lead angle equations.

1 Claim, 26 Drawing Figures

(Manual Track)

(Aided Track)

LASER-SIGHT AND COMPUTER FOR ANTI-AIRCRAFT GUN FIRE CONTROL SYSTEM

This is a division of application Ser. No. 209,268, filed Dec. 17, 1971 now U.S. Pat. No. 3,845,276, issued Oct. 29, 1974.

BACKGROUND OF THE INVENTION

This invention relates to fire control systems and particularly to a system such as an anti-aircraft gun fire control system that provides accurate repetitive or burst gun fire control at a rapidly moving or maneuvering target and that responds to a plurality of variable parameters.

Various gun fire control systems have in the past been produced for particular applications or having a particular feature. For example, U.S. Pat. No. 3,575,085 issued to William E. McAdam, Jr. on Apr. 13, 1971 discloses a fire control system wherein the gun is controlled by an analog computer in response to range information derived from a laser such as a ruby laser of the single pulse variety. This system is used in conjunction with control of anti-tank gun fire. This single range determination made by the single shot or single pulse laser is sufficient for use against stationary or slowly moving earthbound targets, but neither the laser nor the system as a whole is suitable for use in accurate gun fire control against aircraft or other rapidly moving targets.

Representative of prior patents dealing with fire control systems which were intended for use against aircraft are such patents as U.S. Pat. No. 3,288,030 issued to K. G. F. Lind on Nov. 29, 1966 and U.S. Pat. No. 3,339,457 issued to L. Pun on Sept. 5, 1967. The Lind patent discloses a naval anti-aircraft system which employs a rudimentary analog computer loop but which does not make any accurate determination of range. In fact, the Lind device uses a computing system which depends upon the approximation that sin $\theta$ is equal to $\theta$ where $\theta$ is the lead angle. For modern aircraft, the computed lead angles can be as large as 30°. The sin $\theta$ approximation can thus have an error of as much as 4% or 20 milliradians. Since pointing errors should be less than 2 milliradians to achieve a reasonable probability of hit, the computer as described by Lind is necessarily incapable of the required accuracy. Additionally, Lind does not instrument or mechanize the computation of the ballistic function, but merely approximates it with various constants by which the computed kinematic function is multiplied. The Pun patent, on the other hand does detect an accurate range but, like McAdam, it uses in its preferred embodiment a laser which by its inherent characteristics cannot be operated at the rapid pulse repetition rate which can be achieved with a continuously operating laser and hence can not make continuous measurements of the range or rate of change of a rapidly moving target. Pun uses a visual telescope to point at the target but does not disclose the actual technique of such aiming or the accuracy achievable. In order to achieve the required pointing accuracy of 2 milliradians it can be shown that aided tracking is necessary. Furthermore, Pun uses a repetitive algorithm to determine flight time and consequently finds it necessary to utilize an extremely complex digital computer to control gun position.

It is therefore an object of this invention to provide a fire control system having a high degree of accuracy and reliability with respect not only to stationary targets, but also with respect to rapidly moving and maneuvering targets such as aircraft.

It is another object of this invention to provide such a system which overcomes the above-noted problems of the prior art.

It is another object of this invention to provide such a fire control system wherein continuously updated measurements of range of target and rate of change of range are made and are used in both novel tracking aid means and in a novel form a lead angle equation in order to provide greater tracking accuracy for repetitive gun fire and to simplify the mechanization of the computer solving the lead angle equations.

It is a further object of this invention to provide a fire control system having a unified gunner's sight assembly using common optical elements both for visual sighting and for a continuously operable laser transmitter-receiver.

It is yet another object of this invention to provide a fire control system in which provision for manual visual acquisition sighting by the gunner is combined with automatic tracking aid circuitry for targets which have been so acquired and yet permits the gunner to retain override and trim capability of said automatic tracking signals.

It is a still further object of this invention to provide such a fire control system using a solid state hybird computer wherein the simplest, most accurate and most reliable circuits of either the analog or digital type are utilized in accordance with the particular function to be performed.

It is another object of this invention to provide a control unit including the sight, the laser, and the computer which is mounted on the gun platform in vibration isolated relationship thereto in order to maintain essential geometric angular relationships invariant.

SUMMARY OF THE INVENTION

The foregoing objects are achieved by the provision of specific circuits and features in an anti-aircraft fire control system which broadly consists of gun controls, gun servos, and power supplies which may be of any suitable conventional design together with the unique integrated sight-laser-computer comprising the control unit of the present invention. Among the other principle features of novelty of the system are the use of an undisturbed or director sight with a servo system wherein implicit solutions of lead angle equations are generated by a computer loop including a feedback term from the gun servo resolver and with separate circuitry for providing computer aided tracking to the sight. A novel form of lead angle equation is used to facilitate the above-noted implicit solution thereof.

The integrated sight-laser-computer control unit is packaged in a single assembly having as subassemblies a gunner's sight unit and an electronic unit. The gunner's sight unit contains the laser transmitter, the laser receiver, a visual telescope, the optics which combine the three functions, the mirror which points the optical axes to the target, and line of sight azimuth and elevation readout means for taking observations in a coordinate system having one of its axes always lying along the line of sight to the target. This gunner's sight is preferably sealed and filled with dry gas to keep the optics clean. The electronic unit contains the electronics which power and control both the laser rangefinder and pointing of the mirror. Dt also contains the fire control computer which computes the lead angles necessary in azimuth and elevation and provides outputs to the servos which direct the gun's fire. The electronics unit is the interface between the sight-laser-computer control unit and the remainder of the anti-aircraft fire control system.

In operation, the gunner uses his hand control to transmit azimuth and elevation slewing commands to the sight in order to visually acquire a target through the telescope. This only requires the gunner to keep the target within the 3 milliradian circle representing laser beam width. The gunner then activates the laser fire button and the tracking aid circuitry which is also included in the computer. These two functions are controlled by a single switch. The laser will continue to fire at a repetition rate of, for example, 10 pulses per second or more as long as the laser firing button is held down. The computer processes the range and other input data and computes range rate. In the event that the laser beam misses the target or in the event that there is no return signal for any other reason, the computer uses the range rate data to update the last valid range measurement so that the aided tracking circuitry and the lead angle computation will continue to function even if the target goes behind a cloud.

The computer is preferably of the hybrid variety using both digital and solid state analog techniques. The computer solves the equation for gun elevation and azimuth lead angle and generates the pointing angle commands for the gun servos. Solution of the form of the equations used requires that the gun elevation angle, elevation rate, and azimuth rate be transmitted back to the computer. When a signal in the gunner's sight indicates that the gun has been servoed to the direction and range of the target being tracked the gunner opens repetitive fire of the anti-aircraft gun while continuing to track the target. The tracking circuitry is implemented on the assumption that the most likely path of the target will be given by a constant velocity vector. This assumption is obviously always valid since the target may maneuver or change speed or direction. Hence, it has been found desirable to provide both additional quadrant error detecting circuitry and an override feature so that the commands generated by the tracking and quadrant circuits can be trimmed or completely modified by the gunner's hand control as may appear to be necessary based on visual sighting by the gunner. The signals provided by the tracking and quadrant circuits, however, greatly reduce the control requirements imposed on the gunner and permit him to achieve greately increased accuracy in supplying his trimming commands.

BRIEF DESCRIPTION OF THE DRAWINGS

The novel features of this invention, as well as the invention itself, both as to the organization and the method of the operation, will best be understood from the accompanying drawings, taken in connection with the accompanying description, in which like reference characters refer to like parts and in which.

DESCRIPTION OF THE PREFERRED EMBODIMENT

Figure 1A:
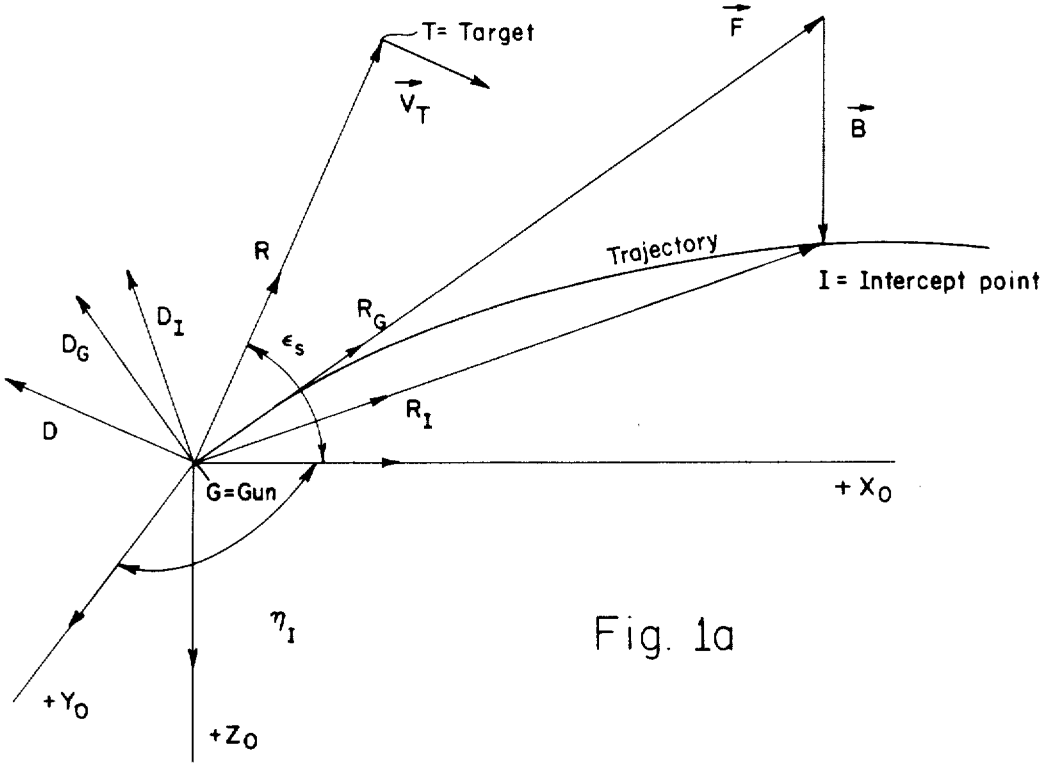
FIGS. 1*a* and 1*b* are mathematical diagrams illustrating relationships between certain vectors, angles, and coordinate systems discussed herein.

The anti-aircraft fire control system of this invention is suitable both for new weapons wherein the system and gun may be integrally designed for each other or for retrofit of existing weapons where improved performance is desired. In order to minimize the number of components used and to increase the speed and accuracy of the preferred embodiment of such a system, the lead angle computation are implemented by utilizing a plural coordinate system and also utilizing a feedback term from the gun elevation axis servo to complete the solution. Characteristics of other major portions of the mechanization of the system are as follows.

The laser rangefinder is preferably of a neodymium-:YAG (yttorum, aluminum, garnet $Y_3Al_5O_{12}$) type, for example operating at at least 10 pulses per second. The detector of the laser receiver is divided into four separate but contiguous guadrant segments to provide a quadrant tracking signal capability. Such a rangefinder is capable of accurate, rapid and continously updated measurements of range and rate of change of range. By contrast to radar tracking systems, it is nearly impossible to jam and has a low vulnerability to countermeasures. For the 20 millimeter gun used in the preferred embodiment herein a full scale laser range of 3,000 meters is provided. For larger weapons the measurable range can be increased to 4,000 or 5,000 meters.

The gunner's sight includes an optical telescope having alternate lens selections to provide a 40° field of view at 1.5 power magnification for acquisition which is changeable to a 10° field of view at 6 power magnification for tracking. The visual sight and the laser transmitter-receiver share common optical elements terminating in a single servo positioned mirror so that no separate boresighting or alignment is required. Reticles are provided for the 10° field of view and for the three milliradan laser beam. The gunner's sight is also provided with an excess gun pointing error warning signal. The system is of course suitable for use against ground as well as air targets.

The tracking aid circuitry shown in FIGS. 9*b*, 9*c* 9*d*, 13 and 14 is such as to provide full automatic track of a constant velocity vector target. However, provision is also made for inclusion of the quadrant detector error signals and for the gunner to retain override and trim capability to adjust for a maneuvering target. The target circuitry will continue to output correct rates even if the target is obscured. The primary function of the tracking aid circuitry, however, is to simplify the gunner's task. The principal requirement on the gunner is that he place the laser beam reticle on the target.

The computer disclosed herein is of the hybrid type utilizing both digital and solid state analog mechanization, and has sufficiently complete capability so that computations or estimates are not required from the gunner. The computer derives smoothed range and range rate information from inputs obtained from the laser and simultaneously solves three lead angle equations. Provision is also made in the mechanization to adjust for nonstandard conditions and for different ammunitions. The computer provides pointing commands to the gun servos derived from its real time implicit solution of the above-noted equations. Physically, the computer is integrated into the control unit electronics package.

In the preferred embodiment of the system, the lead angles are generated in the computer. Further, it is preferred to drive the sight unit as a rate servo and to slave the gun to follow the sight angles plus the computed lead angles. This is a "director sight" mechanization or a nondisturbed sight system. In certain of the above-noted prior art devices, the gun is driven as a rate servo and the sight is slaved to follow the gun angle plus computed lead angles. Such a "disturbed sight" mechanization is not as fast or flexible in its response to moving or maneuvering targets due to the inertia considerations involved. This is, in any anti-aircraft fire control system it is necessary to acquire the target before obtaining any range data. If a disturbed sight is used, the time lags and oscillations of the gun servos in both azimuth and elevation will generate inputs to the sight servos, making acquisition and tracking difficult. Using a director sight of the type disclosed herein makes acquisition much easier since the gunner's direct control of the sight eliminates lag, the much smaller physical size of the sight servo simplifies the task of providing any needed dynamic compensation, and sight is not coupled to the gun servos with respect to elevation.

The gun servos for use with the present system are preferably mechanized as rate plus position servos with high position gain to minimize the velocity following error. Tachometer feedback is preferably used to increase the damping and provide control of dynamic response. The lead angle error is continuously measured and compared with a reference so that whenever the error has a predetermined magnitude, a warning (such as red background lighting of the sighting reticles) may be displayed to the gunner. The gunner can then continue to track the target and wait for the error to diminish before opening fire.

The foregoing type of mechanization characteristics can be achieved in a system utilizing the mathematical formulation of lead angle equations set forth below which in turn assumes that the following two conditions can be achieved, as in fact they can be.

1. If corrections for the effects of nonstandard atmosphere, winds or projectile drift and jump are deemed necessary, an implementation using differential corrections to the solution not accounting for these effects can be made.

2. Projectile trajectory parameters can be computed as simple functions of range to target intercept.

It is shown below that with a judicious choice of coordinate geometry certain approximations can be made that lead to a relatively simple sec of mechanization equations and solution procedures. Although the solution is necessarily approximate, the nature of the approximations are such that the solution will be sufficiently accurate to meet the system requirements set forth above.

For our present purposes, it is assumed that the antiaircraft gun platform is both stationary and level. The solution procedure is valid more generally with the exception that additional resolutions must be made through the gun pitch and roll angles since the projectile ballistics are referenced to the local gravity directions.

Several coordinate systems are necessary for introducing the various measured parameters and ballistics into the basic fire control equations. These corrdinate systems are defined below and the relationships between them are shown schematically in FIG. 1*a* and in FIG. 9*a*.

1. Local level coordinates $(x, y, z)$.

The local level (or gun platform) coordinates are defined with the $Z_0$ axis being positive down and being directed along the local gravitational vector. The direction in the horizontal plane of the $x_0$ axis is arbitrarily chosen to provide a geographically fixed zero reference point for azimuth angle measurements. The $Y_0$ axis forms a mutually orthogonal right-hand set with the $z_0$ and $x_0$ axes. The gun, G, and gunner's sight, for present purposes, are assumed to lie at the same point which is taken as the origin, 0, of all sets of coordinates.

Figure 9A:
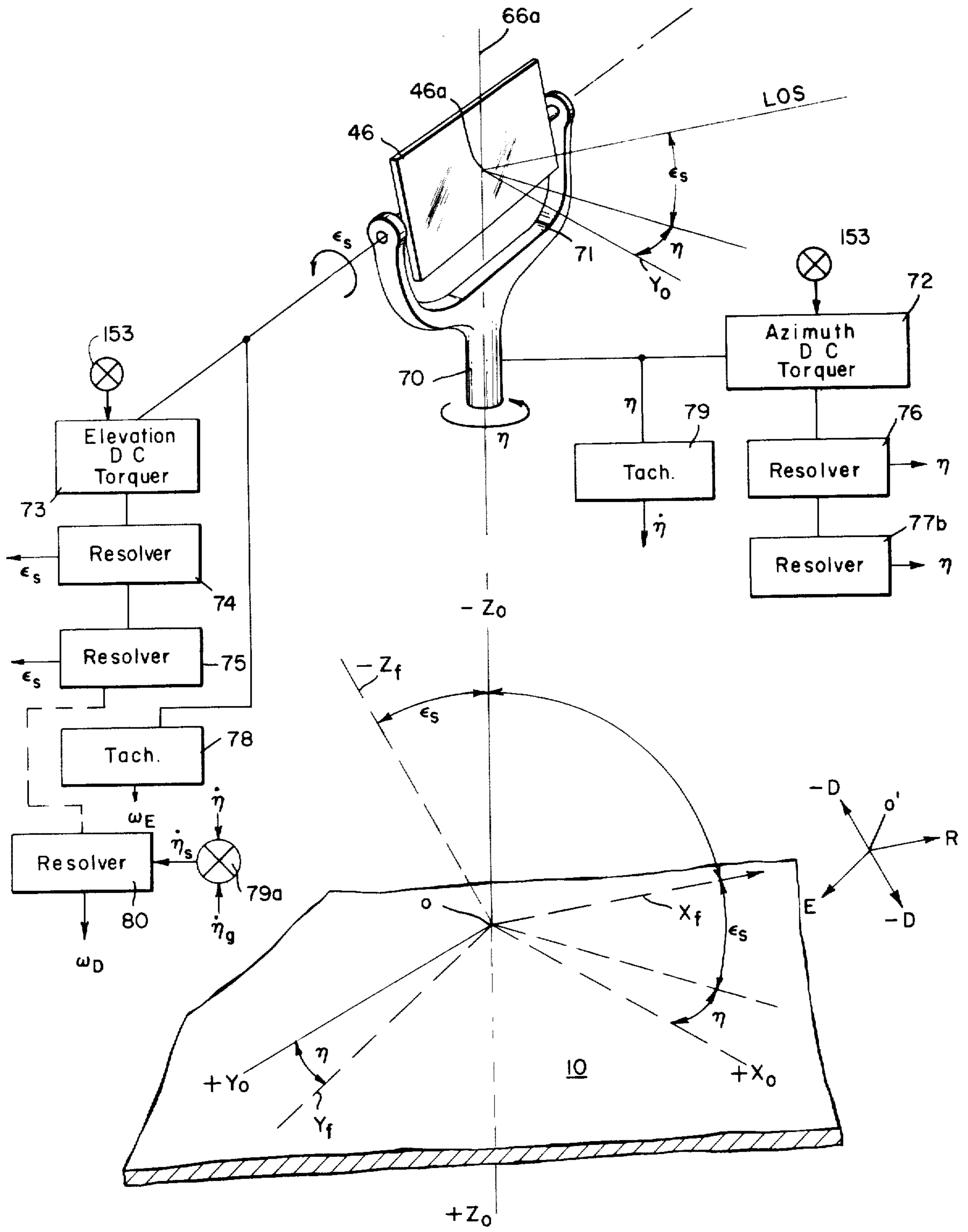
FIG. 9*a* is a diagram illustrating the terms and three dimensional relationships of two of the coordinate systems used in the invention as related to the motion of the gimballed mirror.

2. Los coordinates (R, E, D)

the line of sight coordinates are defined so that the R axis always points from the origin to the target. These coordinates are thus not fixed in position, but move with the target. They are related to the $x$, $y$, $z$ coordinates by a rotation about the $y$ axis through the elevation sight angle $\epsilon_s$ and by a rotation about the $z_0$ axis through an azimuth angle $\eta$ See FIG. 9*a* for illustration of their three dimensional relations. For the sake of clarity only the illustration used in the mathematical derivation of the lead angle equations as seen in FIG. 1*a* shows the special case where a target having a position T at a time $t_o$ (which is the instant the gun is fired), its velocity vector $\vec{V}_T$, the gun G and the target shell intercept point, I, all lie in the $x_o$-$z_o$ plane so that the azimuth angle $\eta$ is zero. Of course the derivation itself treats the general case including provision for any degree of azimuth deflection $\eta$ as illustrated in FIG. 9*a*. This R, E, D coordinate system is then related to the $x$, $y$, system by the relations set forth in Table I below. In FIG. 1*a* a unit vector is shown lying along the R axis and the D axis which is orthogonal to it. The E axis in FIG. 1*a* would coincide with the $y_o$ axis since $\eta$ is assumed to be zero. Similar unit vectors are indicated along the $R_I$, $D_I$ and $R_G$, $D_G$ axes to be discussed below. Also similarly, $E_I$ and $E_G$ will lie along $y$ in FIG. 1*a*.

3. Intercept coordinates ($R_I$, $E_I$, $D_I$)

These coordinates are defined similarly to the R, E, D coordinates with the $R_I$ axis pointing toward the predicted intercept point, I, which is the point where the target's projected velocity vector intersects the predicted trajectory of a shell fired by gun G along a firing direction F. This coordinate system is related to the $x$, $y$ system by the intercept azimuth and elevation angles, $\eta_I$ and $\epsilon_I$. The appropriate coordinate transformation is set forth in Table I below.

4. Weapon line coordinates ($R_G$, $E_G$, $D_G$)

The weapon line coordinates are defined so that the $R_G$ axis points in the direction the gun must be fired to intercept the target T at the intercept point I if the target maintains a constant velocity vector $\vec{V}_T$. These coordinates are related to the intercept coordinates by the ballistic lead angles. Since all such lead angles except superelevation $\epsilon_o$ are to be handled by differential correction, they need not be included in the derivation of the basic fire control equations.

Under these conditions, then, the coordinate transformation between $x$, $y$, $z$ coordinates and weapon line coordinates is as shown in Table I.

TABLE I

COORDINATE TRANSFORMATION MATRICES $$\begin{bmatrix}\vec{1}_R\\ \vec{1}_E\\ \vec{1}_D\end{bmatrix} = \begin{matrix}\cos\epsilon_s & 0 & -\sin\epsilon_s\\ 0 & 1 & 0\\ \sin\epsilon_s & 0 & \cos\epsilon_s\end{matrix} \begin{bmatrix}\vec{1}_x\\ \vec{1}_y\\ \vec{1}_z\end{bmatrix}$$

$$\begin{bmatrix}\vec{1}_{RI}\\ \vec{1}_{EI}\\ \vec{1}_{DI}\end{bmatrix} = \begin{bmatrix}\cos\epsilon_I & 0 & -\sin\epsilon_I\\ 0 & 1 & 0\\ \sin\epsilon_I & 0 & \cos\epsilon_I\end{bmatrix} \begin{bmatrix}\cos\eta_I & \sin\eta_I & 0\\ -\sin\eta_I & \cos\eta_I & 0\\ 0 & 0 & 1\end{bmatrix} \begin{bmatrix}\vec{1}_x\\ \vec{1}_y\\ \vec{1}_z\end{bmatrix}$$

$$\begin{bmatrix}\vec{1}_{RG}\\ \vec{1}_{EG}\\ \vec{1}_{DG}\end{bmatrix} = \begin{bmatrix}\cos(\epsilon_I+\epsilon_o) & 0 & -\sin(\epsilon_I+\epsilon_o)\\ 0 & 1 & 0\\ \sin(\epsilon_I+\epsilon_o) & 0 & \cos(\epsilon_I+\epsilon_o)\end{bmatrix} \begin{bmatrix}\cos\eta_I & \sin\eta_I & 0\\ -\sin\eta_I & \cos\eta_I & 0\\ 0 & 0 & 1\end{bmatrix} \begin{bmatrix}\vec{1}_x\\ \vec{1}_y\\ \vec{1}_z\end{bmatrix}$$

$(\epsilon_T{}^d = \epsilon_I + \epsilon_o)$ $(\eta^d = \eta_I)$

Using the above coordinate systems, the fire control equations can be derived from a basic vector miss equation of the form $$\overrightarrow{\text{MISS}} = [\overrightarrow{\text{FUTURE TARGET POSITION}}] - [\overrightarrow{\text{SHELL BALLISTIC POSITION}}] \quad \text{Eq (1)}$$

The future target position is a function of the presently measured target position $\vec{R}$, the sensed target motion, and the time of flight, $T_f$, of the shell from firing time to the predicted intercept point, I. The ballistic position is a function (through the ballistic equations of motion) of the firing direction and the time of flight. A solution of the fire control problem then is represented by a firing direction and a time of flight that results in a zero miss. Such a solution can be found if one exists, by setting the three components of vector miss in Equation (1) to zero and solving the resulting equation for time of flight and the gun positioning direction.

In order to implement the solution it is necessary to represent the remaining vectors in Equation (1) in terms of measurable or computable parameters. This can be accomplished by proceeding in two steps as follows.

First, consider future target position. The standard assumption for predicting the future target position is that the aircraft is moving with constant velocity. For high speed projectiles with low flight times to intercept this is an adequate representation for moderately maneuvering targets. If the aircraft is taking evasive action it does not appear that any better assumption can be made since then the future aircraft position does not necessarily depend on and cannot be predicted on the basis of past data, the only information available. For this reason the assumption of constant target velocity will be used throughout these derivations.

If $\vec{V}_T$ is the aircraft velocity as shown in FIG. 1*a* the future position at intercept denoted $\vec{R}_I$ can be written $$\vec{R}_I = \vec{R} + \vec{V}_T T_f \quad \text{Eq (2)}$$

Since the aircraft position and velocity parameters will be measured in R, E, D (line of sight) coordinates it is necessary to express this equation in these coordinates.

First, by definition, $$\vec{V}_T = d/dt\,(\vec{R}) = d/dt\,(R\,\vec{1}_R) \quad \text{Eq (3)}$$

so that $$\vec{V}_T = \dot{R}\,\vec{1}_R + R\vec{\omega} \times \vec{1}_R \quad \text{Eq (4)}$$

That is, $$\vec{V}_T = \dot{R}\,\vec{1}_R + R\omega_D\,\vec{1}_E - R\omega_E\,\vec{1}_D \quad \text{Eq (5)}$$

Where the parameters R (laser measured range), $\omega_D$ and $\omega_E$ (rate sensor measured) are measured as described in detail below in connection with FIG. 9*a*. The range rate $\dot{R}$ is computed from the time history of the range.

Substituting equation (5) into equation (2) gives the desired result.

$$\vec{R}_I = (R + \dot{R}\,T_f)\,\vec{1}_R + (R\omega_D\,\vec{1}_E - R\omega_E\,\vec{1}_D)\,T_f \qquad \text{Eq (6)}$$

Secondly, consider the shell's ballistic position. Since the drift due to the projectile spin is small, any inclusion of this effect can be made as a correction to the solution for a planar trajectory. For the purposes of deriving a valid set of fire control equations, the position of the projectile or shell along a trajectory will be described in oblique coordinates as shown in FIG. 1*a*. The position of the shell at intercept can then be written.

$$\vec{R}_I = \vec{F} + \vec{B} \qquad \text{Eq (7)}$$

Where the magnitude of F is the displacement of the projectile from the gun in the firing direction $\vec{1}_{RG}$ and the magnitude of $\vec{B}$, referred to as ballistic drop, is a displacement in the vertical direction that measures the trajectory curvature.

Equation (7) can be written in the form $$\vec{R}_I = F\vec{1}_{RG} + B\,\vec{1}_z \qquad \text{Eq (8)}$$

Where $\vec{1}_z$ is a unit vector pointing down and $\vec{1}_{RG}$ is the unit vector pointing in the direction of the weapon firing line.

Equations (8) and (6) can now be combined into Equation (1) with the miss vector set to zero to obtain the basic vector fire control equation.

$$F\vec{1}_{RG}+B\vec{1}_z = (R+\dot{R}T_f)\vec{1}_R+RT_f\omega_D\vec{1}_E-RT_f\omega_E\vec{1}_D \qquad \text{Eq (9)}$$

In general, the trajectory parameters F and B are functions of the time of flight $T_f$ and the gun elevation angle, $\epsilon_T$, which is equal to the algebraic sum of the intercept elevation angle $\epsilon_I$ and the superelevation $\epsilon_o$. The normal procedure for solving the fire control problems is to express the vector Equation (9) in terms of the three component equations in R, E, D coordinates using the illustrated relationships to write $\vec{1}_{RG}$ in terms of the azimuth lead angle $\eta_I$, the sight elevation angle $\epsilon_s$ and the gun elevation angle $\epsilon_T$. The three scalar equations are then solved iteratively for the three unknowns: time of flight, gun azimuth lead angle, and gun elevation angle. Some variant of this procedure is probably preferable for purely digital computer mechanization. However, for an analog or hybrid mechanization a simpler set of approximate equations can be derived to provide faster response at less cost and with greater reliability.

The first step in the derivation is to replace the ballistic parameters F and B in Equation (9) with the range to intercept $R_I$ and the superelevation angle $\epsilon_o$. The second step is to derive a good approximate procedure for introducing the ballistic superelevation and time of flight in terms of the available parameters.

Figure 1B:
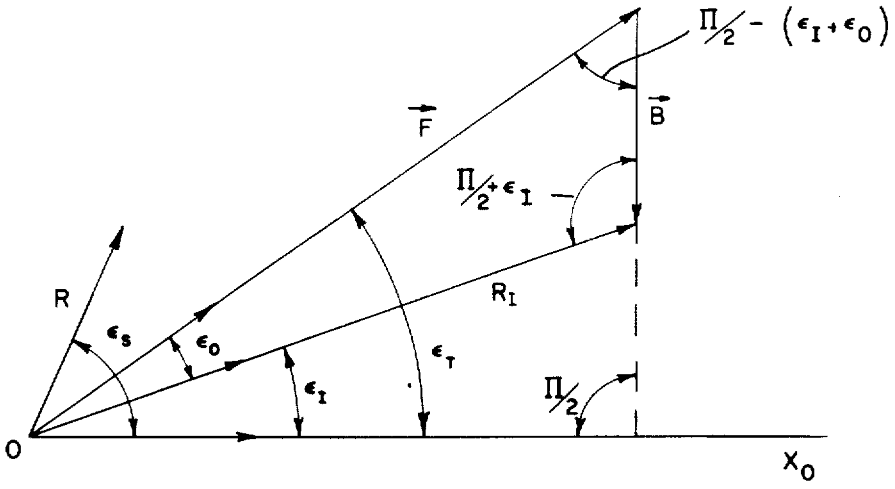

Referring to FIG. 1*b* and using the law of sines, the following relationships may be derived.

$$F\cos(\epsilon_I+\epsilon_o) = R_I\cos\epsilon_I \qquad \text{Eq (10)}$$

$$B\cos(\epsilon_I+\epsilon_o) = R_I\sin\epsilon_o \qquad \text{Eq (11)}$$

Combining these relationships with Equation (4) and expressing the vector equation in terms of components in gun coordinates $R_G$, $E_G$, $D_G$ results in the equation.

$$R_I \begin{bmatrix}\cos\epsilon_o\\ 0\\ \sin\epsilon_o\end{bmatrix} = [\epsilon_o+\epsilon_I]_2\,[\eta_I]_3\,[-\epsilon_s]_2 \begin{bmatrix}R+\dot{R}\;\;T_f\\ R\;\;T_f\,\omega_D\\ -R\;\;T_f\,\omega_E\end{bmatrix} \qquad \text{Eq (12)}$$

Where the notation $[\alpha]_i$ is used to denote a coordinate rotation about the axis $i$ ($x\sim1$, $y\sim2$, $z\sim3$) through the angle $\alpha$.

Since the required gun gimbal angles are $\eta_I$ and $(\epsilon_I+\epsilon_o)$, this equation suggests the possibility of driving the gun azimuth gimbal angle ($\eta_I$) to force the second component to zero and driving the gun elevation angle ($\epsilon_o+\epsilon_I$) until the third component is equal to $R_I\sin\epsilon_o$. Also, since the superelevation angle $\epsilon_o$ is known to be a small angle, the approximations $$R_I\cos\epsilon_o \approx R_I \qquad \text{Eq (13)}$$

$$R_I\sin\epsilon_o \approx \epsilon_o\cdot R_I \qquad \text{Eq (14)}$$

may be used.

Thus, the gun elevation gimbal pickoff can directly give the computed value of $R_I$ and is included in the computation loop. Equation (12) then, along with the approximation (13) and (14) define the basic fire control equations.

Consider now the ballistic function mechanization. If the gun is to be effective as an anti-aircraft weapon, the projectile must have a high velocity in the range of operation and hence relatively a small time of flight. Thus the trajectory will be relatively flat, i.e., the curvature will not be large. This observation suggests the applicability of the classical Siacci approximation to the projectile equation of motion. These approximations in their classical sense are more fully dealt with in a book by E. J. McShane, J. L. Kelley, and F. U. Remo entitled "Exterior Ballistics" published by the University of Denver Press in 1953. This procedure results in an accurate approximation to the ballistic trajectory. However, it is not here proposed that the ballistics be computed with the Siacci method, but rather that use of the results of the method yields, after some manipulation, good functional relationships that can be used to define the form of the ballistics mechanization. It is thus that the value of initially expressing the trajectory in oblique coordinates (F and B parameters) becomes apparent. When the Siacci method is applied in these coordinates the time of flight $T_f$ and the ballistic drop B become functions of F only, or equivalently, F and B are functions of time of flight $T_f$ only (see "Exterior Ballistics" pp. 270–273). Using this fact, the superelevation $\epsilon_o$ and the time of flight $T_f$ can be related to the range at intercept $R_I$ by mechanizing only the functions corresponding to the case where the target is at the sine altitude as the gun. This is accomplished as follows.

Find the range $R_o$ where in the coaltitude case $T_f$ is the same as in the actual case. This implies that F and B will be the same since they are assumed to be functions of $T_f$ only. If $\epsilon_o'$ is the superelevation corresponding to $R_o$ the following equations, equivalent to Equation (10) and (11) above hold:

$$F \cos(\epsilon_I + \epsilon_o) = R_I \cos \epsilon_I \quad \text{Eq (15)}$$

$$B \cos(\epsilon_I + \epsilon_o) = R_I \sin \epsilon_o \quad \text{Eq (16)}$$

$$F \cos \epsilon_o' = R_o \quad \text{Eq (17)}$$

$$B \cos \epsilon_o' = R_o \sin \epsilon_o' \quad \text{Eq (18)}$$

Clearly, by dividing (16) by (15) and (18) by (17), $$\frac{B}{F} = \frac{\sin \epsilon_o}{\cos \epsilon_I} = \sin \epsilon_o' \quad \text{Eq (19)}$$

Then the computation of $\epsilon_o$ is given by, $$\sin \epsilon_o = \cos \epsilon_I \sin \epsilon_o' \quad \text{Eq (20)}$$

Where $\epsilon_o'$ is a function of $R_o$ or $T_f$. It remains to find $R_o$.
From (17) and (15)

$$R_o = F \cos \epsilon_o' = R_I \frac{\cos \epsilon_I \cos \epsilon_o'}{\cos(\epsilon_I + \epsilon_o)} \quad \text{Eq (21)}$$

Combining Equations (20) and (21) and making small angle approximations to the effect that $\cos \epsilon_o' \cong 1$, $\cos \epsilon_o \cong 1$, and $\sin \epsilon_o' \cong \epsilon_o'$ then gives, $$R_o \approx \frac{R_I}{1 - \epsilon_o' \sin \epsilon_I} \approx R_I (1 + \epsilon_o' \sin \epsilon_I) \quad \text{Eq (22)}$$

The term $\epsilon_o' \sin \epsilon_I$ need not be included, since it is a relatively small term.

The fire control equations used herein are a combination of Equations (12) and (20) along with the appropriate function generators for computing $T_f$ and $\epsilon_o'$. These functions are found by standard curve fitting procedures to actual firing tables as described in detail below.

In component form, the equations can be written as follows where quantities A and C have the stated identity definitions.

$$A^{d} = (R + \dot{R}T_f) \cos \epsilon_s - RT_f\omega_E \sin \epsilon_s \quad \text{Eq (23)}$$

$$C^{d} = (R + \dot{R}T_f) \sin \epsilon_s + RT_f\omega_E \cos \epsilon_s \quad \text{Eq (24)}$$

$$R_I = (A \cos \eta_I + RT_f\omega_D \sin \eta_I) \cos(\epsilon_o + \epsilon_I) + C \sin(\epsilon_o + \epsilon_I) \quad \text{Eq (25)}$$

$$O = -A \sin \eta_I + RT_f\omega_D \cos \eta_I \quad \text{Eq (26)}$$

$$O = (A \cos \eta_I + RT_f\omega_D \sin \eta_I) \sin(\epsilon_o + \epsilon_I) - C \cos(\epsilon_o + \epsilon_I) - \epsilon_o \cdot R_I \quad \text{Eq (27)}$$

In the foregoing Equations (25) (26) and (27), which are the three simultaneous lead angle equations mechanized for real time solution as shown in detail below, it should be noted that the superelevation $$\epsilon_o = \epsilon_o' \cos \epsilon_I \quad \text{Eq (28)}$$

where $\epsilon_o'$ and $T_f$ are generated as functions of $R_I$.

In discussing the functioning of actual apparatus hereinafter in connection with FIG. 2 through FIG. 17 certain equivalencies in notation will be used to distinguish angles, values and quantities in the specific case of actual apparatus from coordinate means of quantities used in the general derivation above. Thus, actual specific values of range to intercept will be referred to as $R_i$ rather than the coordinate or vector notation $R_I$, the actual gun azimuth angle will be referred to as $\eta_g$ rather than $\eta_I$ which is the value that $\eta_g$ must have when a correct solution of the lead angle equations has been achieved and the gun positioned in accordance therewith; similarly the actual gun elevation angle will be referred to as $\epsilon_T$ rather than $(\epsilon_I + \epsilon_o)$.

Turning now to FIGS. 2*a* through 2*d*, the structural details of the packaging and positioning of a control unit 20 used in apparatus for implementing and mechanizing the foregoing concepts and relations will be described. A conventional rotatable gun mounting platform 10 also supports the gunner and the control unit 20 for rotation with a conventional anti-aircraft gun G, shown diagrammatically only. The gunner occupies a chair or seat 11 of any suitable design which is mounted on a vibration isolation unit 12 which in turn is mounted on the gun platform 10. A footrest 13 is also provided and is mounted on platform 10. The sighting unit and electronics unit housings are mounted on a vibration isolation unit 14 which in turn is mounted on the gun platform 10. A power supply package 15 containing any suitable conventional power supply is also positioned on gun platform 10. The gunner and control unit 20 are positioned directly in back of the gun on platform 10.

Figure 3:
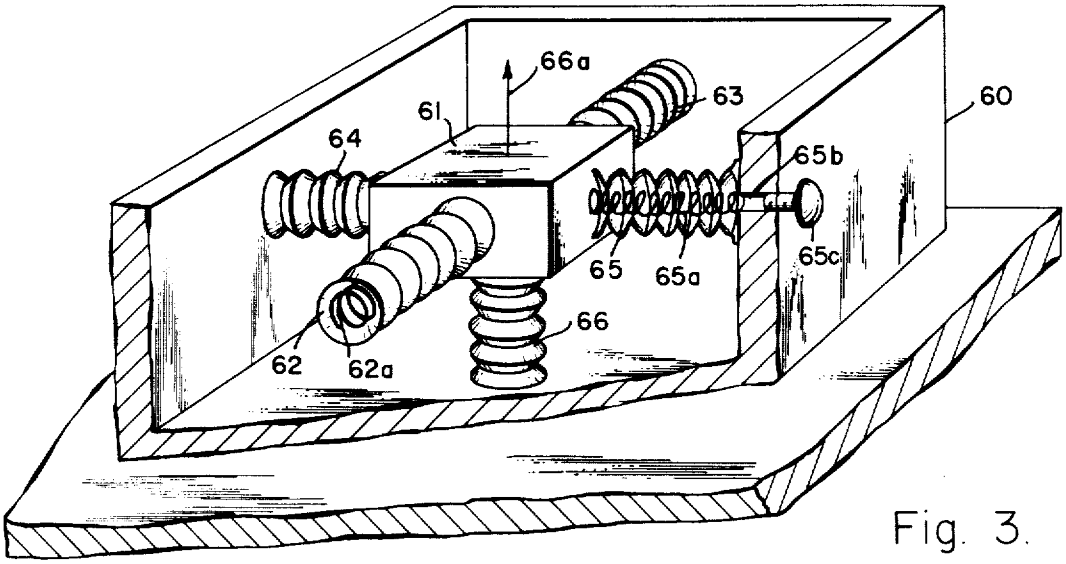
FIG. 3 is a broken away perspective view of a vibration isolation mount suitable for use in the system.

The vibration isolation unit 14 operates on the principle illustrated in FIG. 3 in which a cup-shaped housing 60 is shown rigidly mounted to the rotatable and vibration-generating gun platform 10. It will, of course, be understood that the front wall of the cup-shaped member 60 has been broken away for purposes of clarity of illustration, but that in practice the generally cup-shaped member 60 is open at the top so that the member to be supported may be mounted by a pedestal or any other convenient means to a centrally positioned block 61. Thus, in the isolation unit 14 the control unit 20 is directly attached to a member such as the block 61, which in turn is supported from the cup-shaped member 60 by five metal bellows members 62, 63, 64, 65 and 66, respectively. The ends of each bellows member are respectively fastened, one end to the central block 61 and the other end to the outer rigid cup member 60. Within each bellows member is a stiff spring member such as the springs 62*a*, 64*a*, and 65*a*, respectively. The springs are also attached at opposite ends to the block 61 and the cup member 60. Additionally, each bellows member is sealed and is provided with an air inlet, such as the passage 65*b*, which is closed by a threaded valve and cap members 65*c*. The air leakage rate from each bellows member can thus be adjusted at 65*c* to any desired value by the leakage from the threads of the cap member 65*c* functioning as a valve, thereby controlling the amount of damping present in the system.

The purpose of the vibration isolation unit is primarily to maintain the orthogonal or perpendicular relationship between the vertical axis indicated by the arrow 66*a* rising upwardly from block 61 and the plane of the gun platform 10 as a rigidly unchanged angle in spite of providing damping for translational vibrations of the platform 10. That is to say, the arrangement constitutes a shock absorber which will permit damped vibration along the axes represented by the longitudinal axis of any one of the bellows-springs combinations in response to vibrations of the platform 10, but will eliminate any rotational component of motion about these axes. This desired result arises from the fact that the bellows structure has inherent in its nature a considerable give or spring axially of its length as the folds of the bellows expand or contract. However, the bellows structure is made of a metal such that the bellows is wholly resistant to any expected torsional or twisting forces tending to produce rotation about its axis. Since no one of the bellows members can be twisted, all components of torsional or rotational motion are eliminated, even though the arrangement does serve as a shock absorber to permit damped translational motion to absorb the energy resulting from vibration of the platform 10 as the gun fires. Preferably, since the firing repetition rate of the gun is at a frequency which is preselectable, the structure of the isolation unit, together with the air leakage rate established at any given time, will be such as to detune the vibration isolator from resonance at the same frequency as the frequency of the expected source of vibrations, that is, the repetition gun firing frequency.

It will, of course, be understood that the showing of the housing 14 in FIG. 1 is diagrammatic only and that any suitable pedestal arrangement may be used to mount the control unit 20 to the interior block member of its associated vibration isolation unit of the type shown in FIG. 3. It is assumed, however, that the mounting will be such that the vertical arrow 66*a* in FIG. 3 will lie along the direction of the local gravitational vector so that it represents the vertical $z_0$ axis in the inertial coordinate system in which the gun platform 10 while at rest is in the $x_0$–$y_0$ or horizontal plane.

Referring again to FIGS. 2*a*, 2*b*, and 5, the optical sighting control unit 20 is used by the gunner to acquire a line of sight, LOS, on a target T along coordinate R by rotating gimballed mirror 46 in response to signals generated by hand control unit 26*a* positioned on platform 10 within easy reach of the gunner. It will be noted that the structure and the position of biocular 17–18 is such that in use the gunner's head is erect. This is more comfortable for the gunner and results in less disorientation when rapidly slewing in azimuth.

Figure 2A:
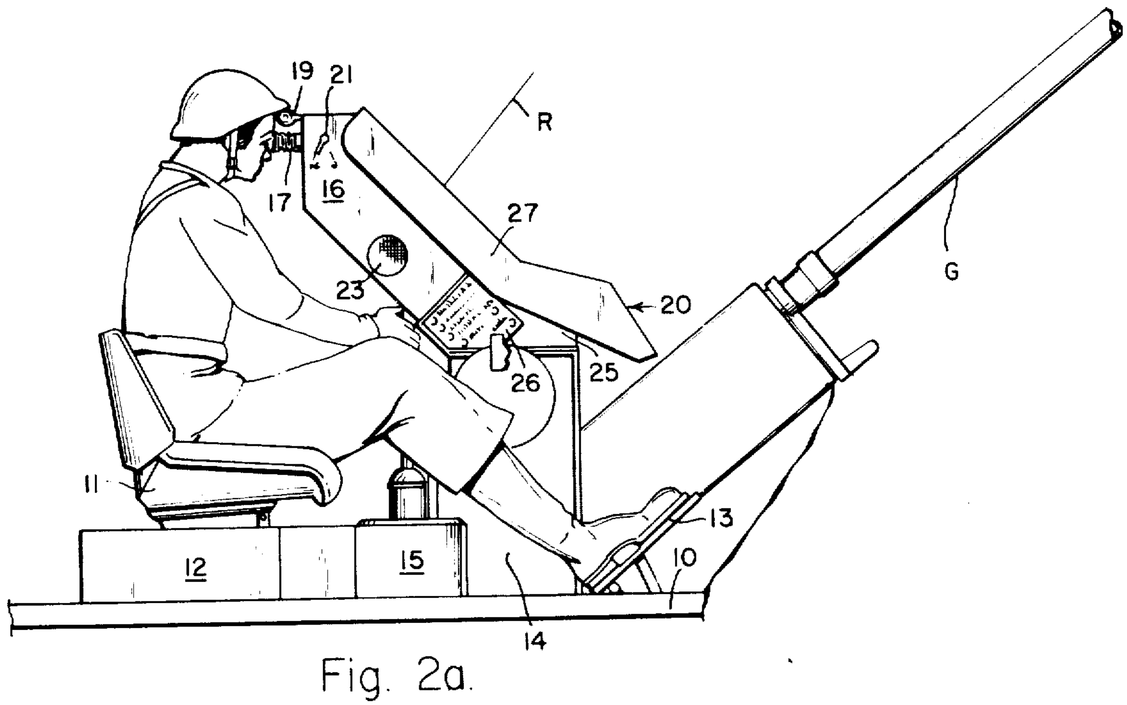
FIG. 2*a* is a diagramatic side elevational view showing the gunner's relationship to the control unit containing the integrated sight-laser-computer.
Figure 2D:
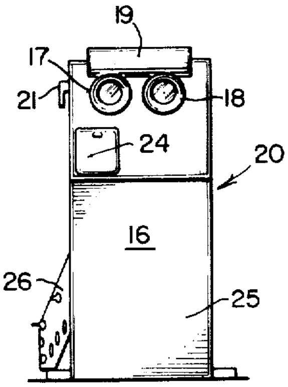
FIGS. 2*b*, 2*c*, and 2*d* are respectively side elevation, top, and end views showing the control unit housings in greater detail when dismounted from the gunner's seat and platform.
Figure 2C:
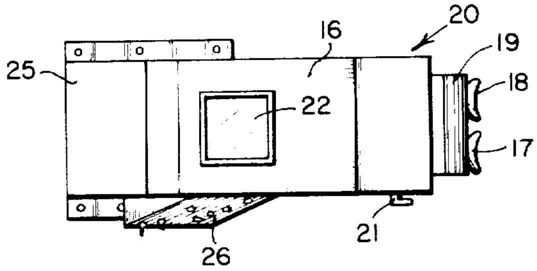
Figure 2B:
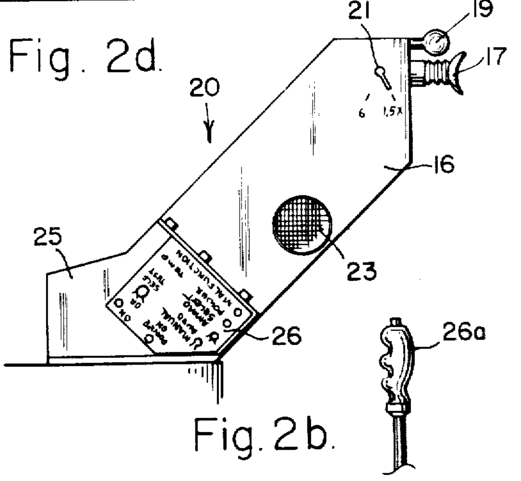
Figure 5:
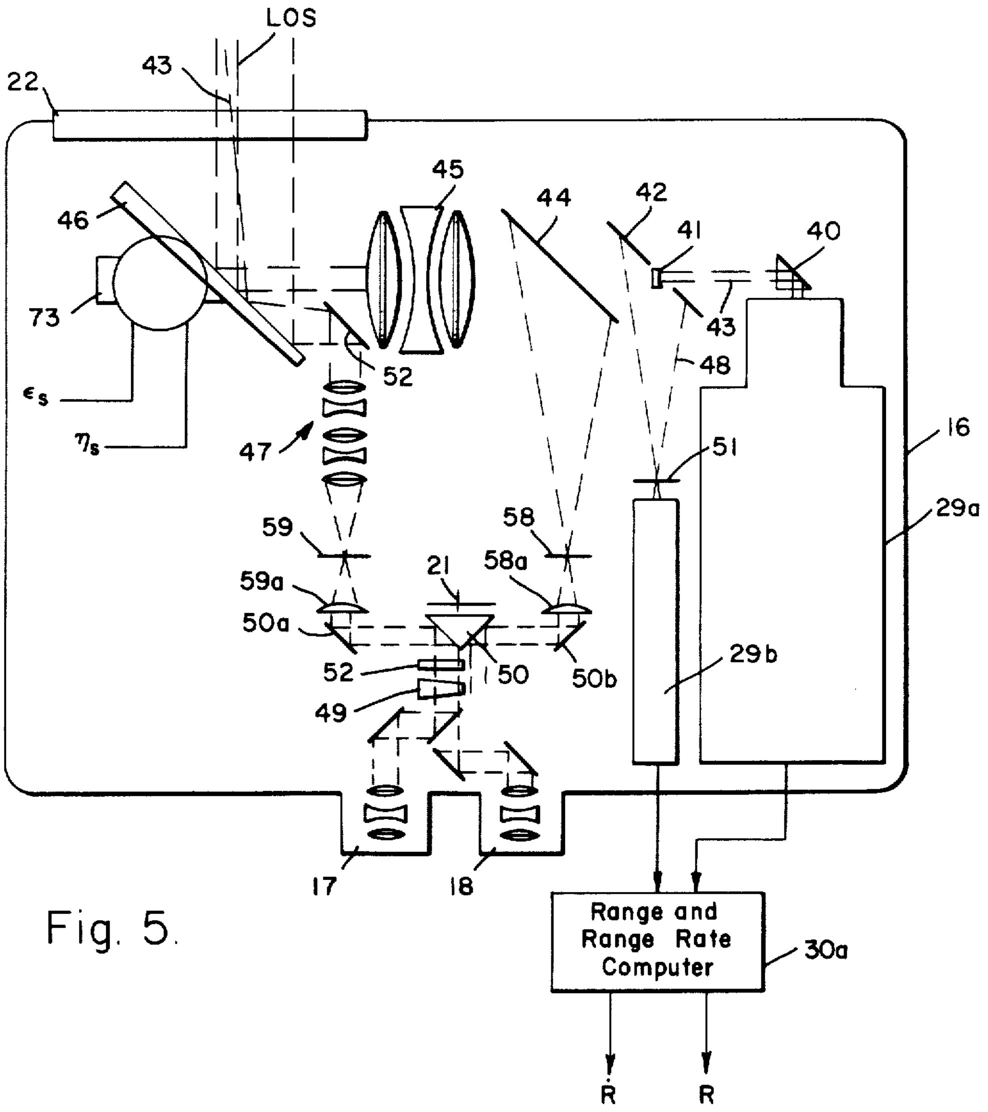
FIG. 5 is a schematic layout diagram of the laser and optical elements within the gunner's sight unit.

The control unit 20 is shown in greater detail in FIG. 2*b*, 2*c*, and 2*d* and comprises a gunner's sight housing 16 which is provided with a biocular pair comprising first and second visual telescope eye-pieces 17 and 18 positioned as noted for convenient visual access by the gunner. A gunner's headrest 19 is provided adjacent to the eyepieces. Adjacent to the eyepieces and mounted on the housing 16 is a lever 21 connected inside the housing to a slideable mirror block in the visual telescope so as to permit the gunner to select either of the two above-noted magnifications and field of view lens choices for the telescope. Sliding mirror block 50 is shown in FIG. 5. The magnification selector lever 21 is of course mounted to be within easy reach of the gunner.

The housing 16 of the gunner's sight unit contains the visual telescope for optical sighting, the laser transmitter-receiver range unit, and the optical elements permitting these units to establish a common line of sight, LOS, at the target along and (when on target) coincident with coordinate R through a window 22 in the gunner's sight unit 16. The gunner's sight unit 16 is also provided with a vent 23 for air cooling of the equipment. Access to the flash tube of the laser may be had through a door 24 in housing 16.

The electronics unit housing 25 forms a continuation of the gunner's sight unit housing 16 and contains the fire control computer and the laser electronics. The housing 25 is provided with an external control panel 26 containing various controls which will be described in detail below. Housing 16 is mounted on housing 25 which in turn is mounted on the center block of the vibration isolation unit 14 which in turn is mounted on the rotatable gun platform 10. The power supply 15 is positioned so as to be readily connected to the equipment in the electronics unit 25. As may be best seen in FIG. 2*a*, the gunner's sight unit 16 and electronics unit 25 which comprise the sighting unit 20 are provided with a protective shield 27 which also serves to afford protection to the gunner. Of course the shield 27 is provided with a suitable aperture for alignment with window 22 for sighting purposes so that the gunner may establish a line of sight (LOS) on the target T.

Figure 4:
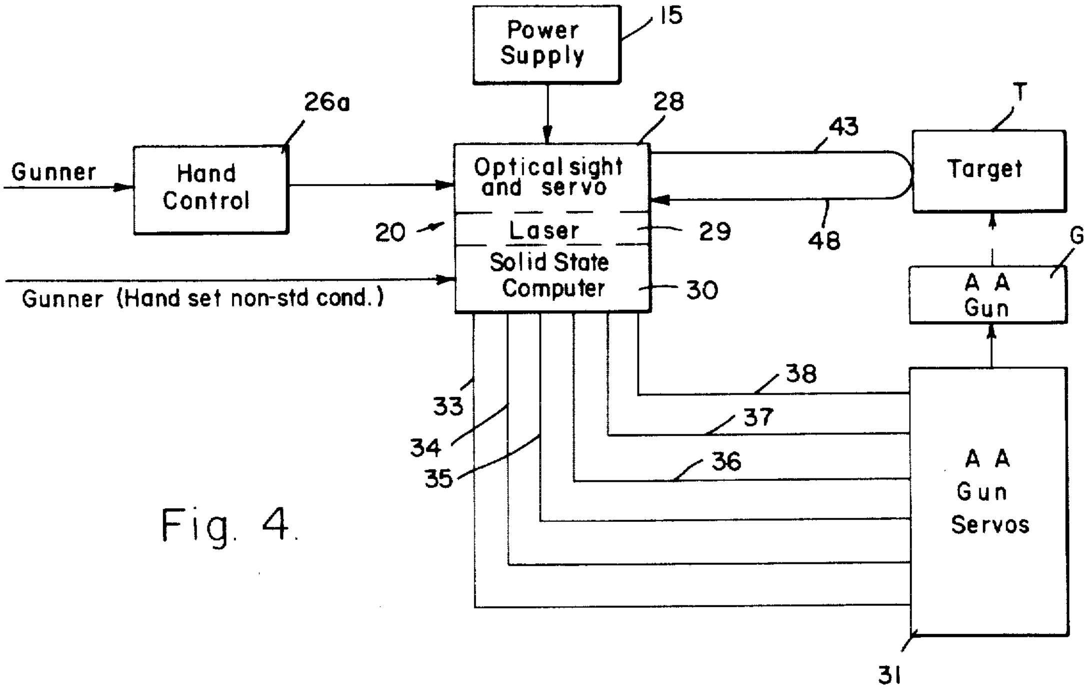
FIG. 4 is a block diagram of the anti-aircraft fire control system of the present invention.

In FIG. 4 there is shown an overall block diagram of the system. From FIG. 4 it will be seen that the control unit 20 receives hand control signals or slewing commands to the gimballed mirror in the sight which are generated by the gunner by means of a control stick 26*a* with potentiometer pickoffs. This may, for example, be a Cadillac Gage type unit similar to those used for tank fire control. Controls on panel 26 (FIG. 2*b*) are available to the gunner for setting in nonstandard conditions such as ammunition being used, gun wear, atmospheric conditions and the like. The settings of the nonstandard conditions are applied directly to the solid state computer 30 which is contained in the electronics unit 25. The laser 29 and the optical sight and servo 28 are contained in the gunner's sight unit housing 16.

In response to signals generated by the computer 30 shown in FIG. 4, conventional anti-aircraft gun servos 31 control an anti-aircraft gun G which is mounted on the platform 10. Thus, line 33 applies an elevation command to the servos 31, line 34 applies an azimuth command, and line 35 applies an error comparison reference voltage to the gun servos. Feedback signals from the gun servos are in turn supplied to the computer 30. Thus, line 36 carries an elevation feedback signal from a tachometer, line 37 carries an azimuth feedback signal from a second tachometer (both of these signals of course being measures of rate of change of elevation and azimuth respectively), and line 38 carries signals which are representative of the actual elevation and azimuth angles of the gun and which are derived from a conventional synchro-type resolver associated with the gun servos.

The details of the arrangement of the optical sight and sight servos 28 and the laser 29 in the gunner's sight unit housing 16 are diagrammatically shown in FIG. 5. It will be noted that the laser transmitter 29*a* and the laser receiver 29*b* are positioned adjacent to each other. The laser output beam is transmitted through a prism 40 (which turns the beam by 90°) to a beam expanding lens 41 which is positioned at the center of a silvered mirror 42. The silvered mirror 42 is positioned at a 45° angle to the axis of the light beam 43 which is transmitted in the forward direction through the beam expanding lens 41, through a dichroic mirror (which is transparent to the laser beam in the forward direction) 44 and through the lens system 45 which also constitutes the narrow field of view objective lens for the gunner's visual telescope. Lens system 45 is optically designed to produce a 3 milliradian laser output beam.

Beam 43 thereafter impinges on the gimballed mirror 46 and is reflected from mirror 46 out of window 22 in housing 16 and along the line of sight to the target. The gimballed mirror 46 is controlled as to rotational position about 2 axes which are shown in greater detail in FIG. 9*a* by torquers of any conventional type well-known in the art in response to signals provided as above-described.

When the laser beam 43 strikes a reflective target a portion of its light energy is returned along the line of sight and is reflected by gimballed mirror 46 through lens system 45, through the dichroic mirror 44 and onto the reflecting surface of the silvered mirror 42. Dichroic mirror 44, of course, is selected to be of the type which transmits light of or near the wavelengths emitted by the laser and reflects all other wavelengths. Most of the return signal is thus transmitted to silvered mirror 42 and thence along a path 48 to the laser receiver 29*b*.

The gunner's visual telescopic sighting system includes the eyepiece assemblies 17 and 18 respectively (which are adapted for biocular vision along a single line of sight by conventional prism arrangements including a derotation prism 49) and the slideably positioned dual mirror block 50 which is under control of the magnification selector 21 projecting out of housing 16. In the position shown one of the mirrors on dual mirror block 50 completes an optical path through fixed mirror 50*a*, relay lens 59*a*, the wide field of view objective lens system 47, to a fixed mirror 52, and thence on to the gimballed mirror 46 for reflection along the line of sight. If the mirror block 50 is positioned to the left of the position shown in FIG. 4, its other mirror surface will direct the gunner's or observer's sight via fixed mirror 50*b* rather than via fixed mirror 50*a*. The line of sight from fixed mirror 50*b*, of course, leads via relay lens 58*a* through dichroic mirror 44 to the narrow field objective lens system 45 and then on to the gimballed mirror 46 and out along the line of sight. The fact that the magnification selector 21 manually shifts the prismatically shaped mirror block 50 through a relatively short path of travel permits the gunner to change the magnification without interrupting his continuous view of the target. An eye protection filter 52 positioned between the mirror block 50 and the derotation prism 49 prevents any laser light which may have accidentally reached the mirror block 50 from being transmitted through the bioculars so that the gunner's eyes are protected from damage.

Figure 6:
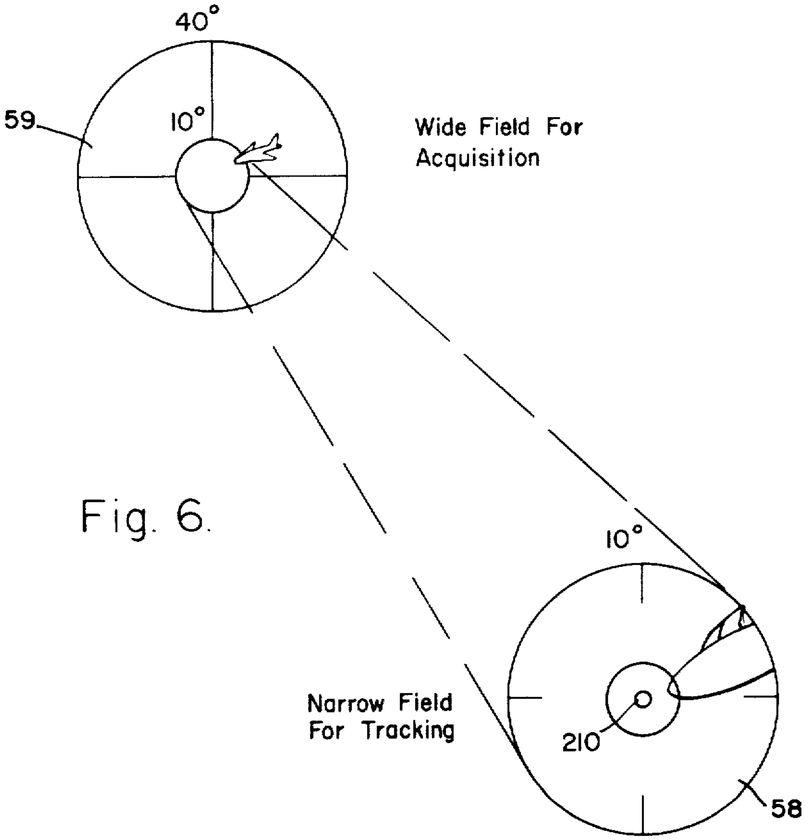
FIG. 6 is a diagramatic plan view of alternatively selectable visual reticles as they appear in the gunner's visual telescope.

As seen in diagrammatic plan views in FIG. 6, the preferred reticle systems for the two fields of view are respectively configured as at 58 for the narrow field of view and 59 for the wide field of view. Relay lenses 58*a* and 59*a* are associated with the respective reticles and may be used to also transmit backlighting for them in any conventional manner. It will be noticed that the wide field of view optics have a magnification of 1.5 to 1 and a field of view of 40°. The reticle for this telescope has a 10° circle at its center (see FIG. 6) which corresponds to the size of the full field on the narrow field of view optics. Once the target is inside this inner circle of the wide field of view, the sliding mirror 50 is moved by the magnification selector 21 to bring the narrow field of view telescopic path into use. The narrow field of view optics have a 10° field of view and a magnification of 6 to 1. The product of magnification times field of view is thus, and should be, a constant which in this case has a value of 60 for either telescope. The reticle for the 10° field consists of several sizes of circles, the smallest being 3 milliradians in diameter. The gunner tracks the target by centering the three milliradian circle on it. The laser rangefinder optics share the narrow field of view objective lens so that the combined functions can be simultaneously boresighted and will remain in exact optical alignment with one another. The dichroic mirror reflects all the visual light, but allows the infrared laser light to pass through. Laser light from the transmitter passes through the diverging lens and the objective lens which together form a Galilean telescope. This telescope forms the three milliradian laser beam. Laser light which returns from the target is reflected from the silvered mirror 42 and passes through the receiver field stop 51 to the laser receiver 29*b*. A small but insignificant fraction of the return light is lost through the hole in the center of the silvered mirror mounting lens 41. The field stop 51 is a small hole which corresponds exactly to the three milliradian circle in the visual optics. In this fashion the three optical axes, that is, the axis of the tracking telescope, the laser transmitter axis, and the laser receiver axis are permanently aligned.

Figure 7B:
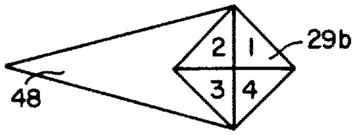
FIG. 7*b* is a diagram of the quadrant detector.

The laser transmitter 29*a* is preferably a continuously operable type such as a neodymium:YAG unit which used a closed cycle, dry gas cooling scheme completely free from the problems associated with all liquid cooling systems. This laser produces light having a wavelength of 1.06 microns, is capable of a pulse repetition rate of 10 pulses or more per second and has a beam width of three milliradians. The laser receiver 29*b* is provided with four independent detectors arranged in a quadrant as shown in FIG. 7*b* so that tracking data can be derived in a manner to be explained below. The detectors are preferably separate photodiodes and should of course be such as to have their peak sensitivity at or near the wavelength of the light of the particular laser being used.

Since both the wide and narrow field of view include the gimballed telescopes mirror 46 in their paths for selecting and varying the line of sight, both have the same response characteristics for tracking. In a preferred embodiment the maximum elevation tracking rate was 55° per second whereas the maximum azimuth tracking rate was 100° per second.

Figure 15:
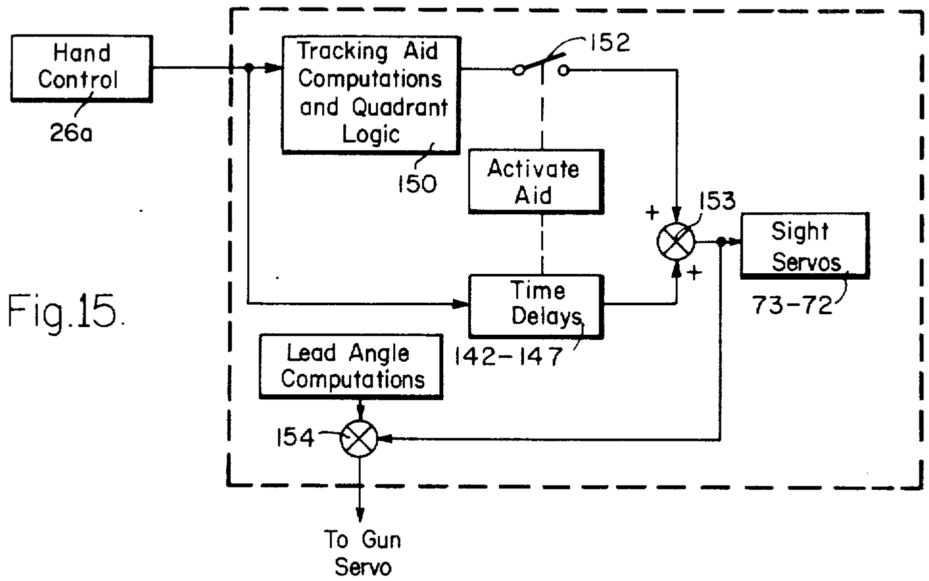
FIG. 15 is a block diagram showing the relation between tracking aid, sight servo and gun servo mechanization circuitry respectively.

In operation the gunner first activates the power supply 15 which, in a preferred embodiment is capable of an output of 300 to 600 watts, and then uses his hand controls 26*a* to transmit azimuth and elevation slewing commands to the torquers 72 and 73 controlling the gimballed mirror 46 in the sight unit as shown, for example, in FIG. 9*a* and in FIG. 15. This initial phase only requires the gunner to keep the target within the 3 milliradian circle. When this circle is on target, the gunner activates a laser fire button which starts operation of the laser transmitter 29*a*, laser receiver 29*b* and the tracking circuits contained in the computer 30. Activation of these functions is accomplished by a single switch 152 positioned on the gunner's hand control 26*a*. The laser will continue to fire at a repetition rate of 10 pulses per second as long as the firing button is held down. In the event that the laser beam misses the target or if for any other reason there is no return laser signal, the computer uses range rate data previously obtained and stored to update the last valid range measurement. The computer then solves the equations for gun elevation and azimuth lead angle and sends pointing angle commands to the gun servos 31 of FIG. 4 which are shown in detail at 110 of FIG. 16 and 110*a* of FIG. 17.

Figure 11:
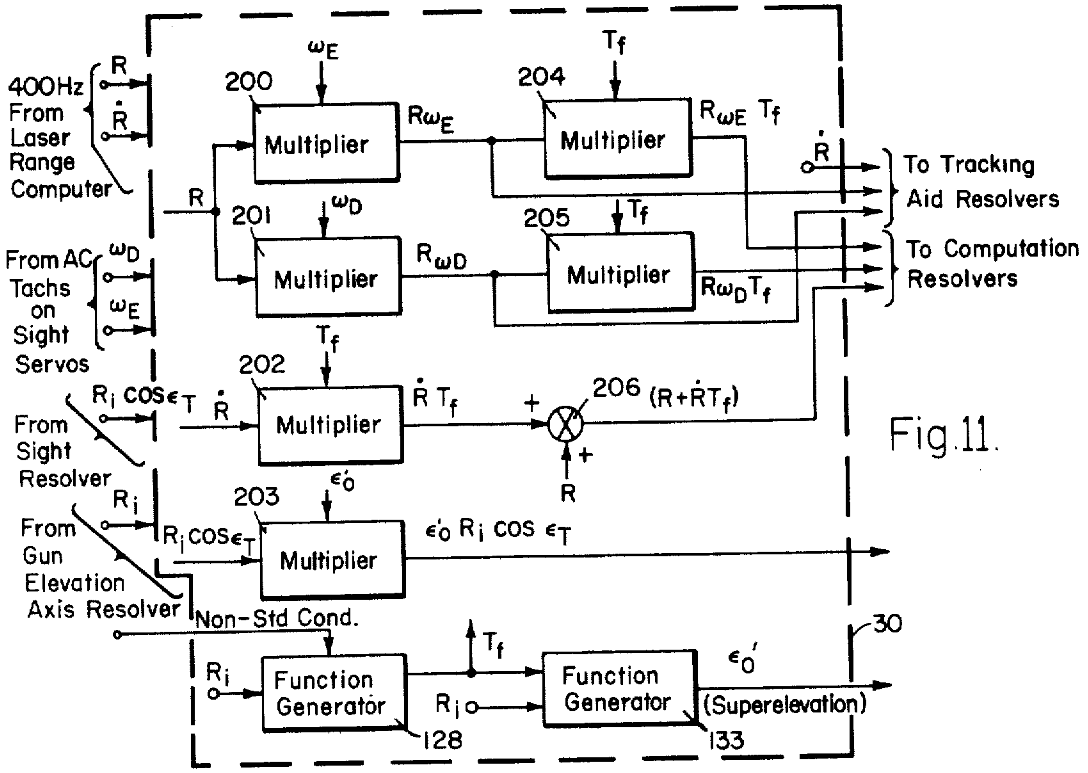
FIG. 11 is a functional computation diagram further illustrating details of certain of the computations performed in the computer shown as block 30 in FIG. 10

The laser rangefinder 29, of course, measures the range to target T by sending out a light pulse from laser transmitter 29*a* and counting the elapsed time until the pulse is reflected from the target and returned to the laser receiver 29*b*. This is actually done in a subportion 30*a* of computer 30 by gating computer clock pulses into a digital counter in a manner well-known in the art as indicated in detail in FIG. 7*a*. Each laser pulse is a separate and independent range measurement. With a repetition rate of 10 pulses per second, range data is acquired at a rate of ten range measurements each second. Computer 30*a* also calculates smoothed range and range rate, and quadrant track information. The laser rangefinder is reliable and trouble free; it will run continuously at 10 pulses per second for many hours without maintenance. Unlike radar, it it nearly impossible to jam. Range computer 30*a* has outputs which are digital values of R and R which are applied to other circuitry in fire control computer 30 as shown in FIG. 11.

Figure 8:
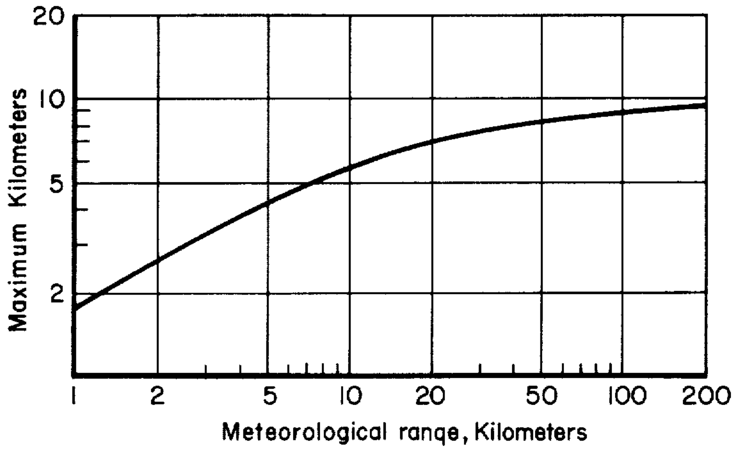
FIG. 8 is a graph of range capability of the system.

The most important aspect of the performance of the laser rangefinder is its maximum range capability which is shown in the graph of FIG. 8. The maximum range is the distance to which the rangefinder will detect a given target with a given single-shot detection probability, usually 99%. The maximum range capability is a function of atmospheric conditions. This is shown in FIG. 8, where the maximum range is graphed as a function of the meterological range. The meterological range is that distance over which contrast transmittance in the visible region of the spectrum is reduced to 2%. The meterological range is the maximum distance at which a small, low contrast target can be detected by the human eye. Therefore, from the graph we see that the laser rangefinder will range to any visible target out to 4,000 meters and to 10,000 meters under clear weather conditions. The range accuracy at a clock frequency of 60 megahertz is ± 2.5 meters and is independent of magnitude of range.

The laser receiver 29*b* consists of four electrically independent detectors arranged in a quadrant pattern as illustrated in FIG. 7*b*. Each detector is a light sensitive diode large enough to provide a separate output if it is illuminated by the return light pulse. The sensitivity of a detector is such that a change in output can be observed when approximately 50% of the area is illuminated. With a total beam width of 3 milliradians, this is a equivalent sensitivity of approximately three-fourths of a milliradian. The quadrant logic circuitry 52 is designed to convert the detector signals to line of sight position error commands for use in the automatic tracking circuits supplying signals to the sight servo torquers.

The quadrant pattern illustrated in FIG. 7*b* provides four independent signals to logic circuitry 52. These signals are combined to provide the logical drive commands to the sight sensor. For example, the combination of outputs from detectors 1 and 2, and no outputs from detectors 3 and 4 result in a $-\Delta\epsilon_s$ command (the sight line is too low, and must be elevated). If there is only an output from detector 1, then not only will there be a $-\Delta\epsilon_s$ command, but also a $-\Delta\eta_s$ command (the sight line must be rotated to the left). All of the possible combinations are included in logic circuit 52 by techniques well-known in the digital logic circuit art.

FIG. 7 *a* shows the signal flow used to output range and range rate information. The outputs of the four laser detector quadrants are supplied in parallel to the conventional time measuring and range computation circuitry in computer 30*a* the output of which, as noted above, is a digital value of range R which is supplied to a range storage register 55. The outputs of the four quadrant detectors are also supplied to NOR gate 53 which controls the clock gate 54 so that clock signals are not applied to shift register 55 if no detector has an output signal. When there is a return signal, i.e., an output from any detector, values of range are read out of register 55 and are supplied to range rate logic circuitry 56 which uses an algorithm to compute a smoothed value of rate of change of range and supplies it as an input to the missed returns logic circuitry 57. The actual value of the last valid measurement of range itself is also supplied to the missed return logic circuitry 57. When it detects a missed return it outputs the last valid value of range plus R Δt. That is to say, if a valid present return signal is not present in 57, standard logic circuits are used to provide an output in accordance with the equation $R = R_{old} + R\Delta t$. Thus the outputs of circuitry 57 are the current projected values of range and rate of change of range based on the assumption that the target has maintained a constant velocity vector since the last valid reading of the range based on actual laser return measurement. Transients in lead angle computation are thereby avoided.

The laser derived range signal is available as an analog voltage and can be differentiated. Because differentiation tends to accentuate any noise which may be present in the measurements, smoothing of the derivative is necessary. This can be done by fitting a straight line to the last five values of R (available in the digital domain at 0.1 sec intervals) according to a least square criterion. The initial delay is then 0.5 sec, and subsequent outputs appear at 0.1 sec intervals.

The smoothing algorithm used in circuit 56 is derived as follows. If measurements $Y_i$ are recorded every $\delta t$ seconds, then the deviation of the straight line $y = a$ bi $\delta t$ from the $i^{th}$ measurement is $$\epsilon_i = (a + bi\delta t) - Y_i$$

The total square error over five measurements ($i = 0, 1 \ldots 4$)

$$E^2 = \sum_{i=o}^{4} \epsilon_1{}^2 = \sum_{i=o}^{4} (a^2 + 2abi\delta t + b^2 i^2 \delta t^2 + Y_i^2 - 2aY_i - 2bi\delta t Y_i)$$

Minimizing $E^2$ with respect to a and b gives $$\frac{\partial E^2}{\partial a} = 0 = (2)5a + (2)\, b\delta t \sum_{i=o}^{4} i - (2) \sum_{i=o}^{4} Y_i$$

$$\frac{\partial E^2}{\partial b} = 0 = (2)a\delta t \sum_{i=o}^{4} i + (2)b\delta t^2 \sum_{i=o}^{4} i^2 - (2)\delta t \sum_{i=o}^{4} i\, Y_i$$

Noting that $\sum_{i=0}^{4} i = 10$, $\sum_{i=0}^{4} i^2 = 30$ these become $$5a + 10\, \delta t b = \sum_{i=o}^{4} Y_i$$

$$10a + 30\, \delta t b = \sum_{i=o}^{4} i\, Y_i$$

Solving for b yields $$b = \frac{\sum_{i=o}^{4} (i-2)\, Y_i}{10\, \delta t} = \frac{2(Y_4 - Y_0) + Y_3 - Y_1}{10\, \delta t}$$

In the computational program for Range Rate, the $Y_i$ are measurements of R, while b represents $\dot{R}$ the smoothed derivative of this quantity.

Figure 7A:
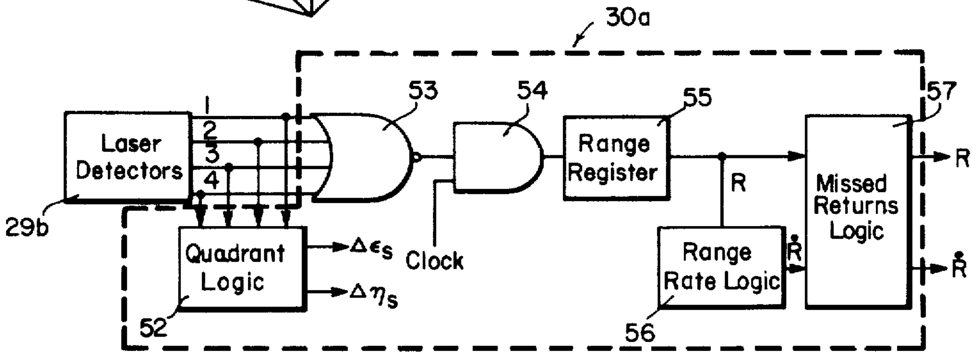
FIG. 7*a* is block diagram of the quadrant tracker, the laser rangefinder, and other laser electronic functions.
Figure 13:
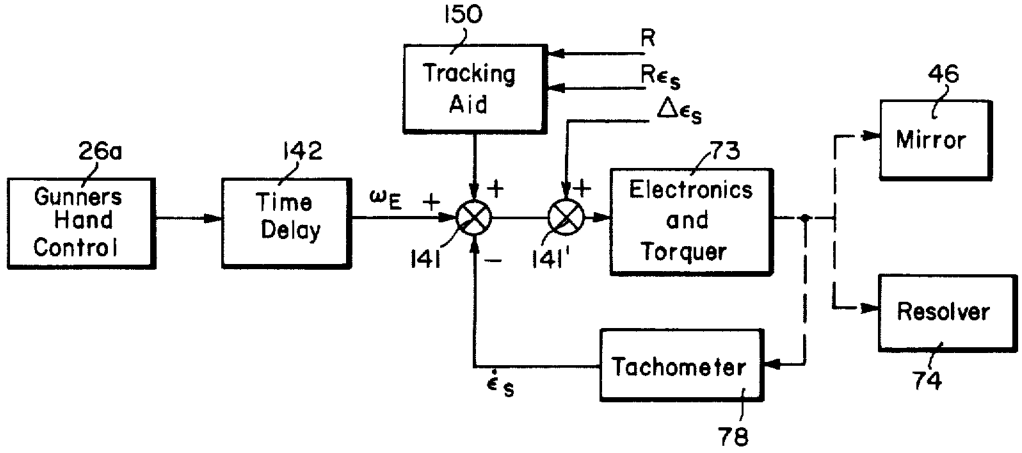
FIG. 13 is a block diagram showing details of the elevation tracking loop for sight servo control.
Figure 14:
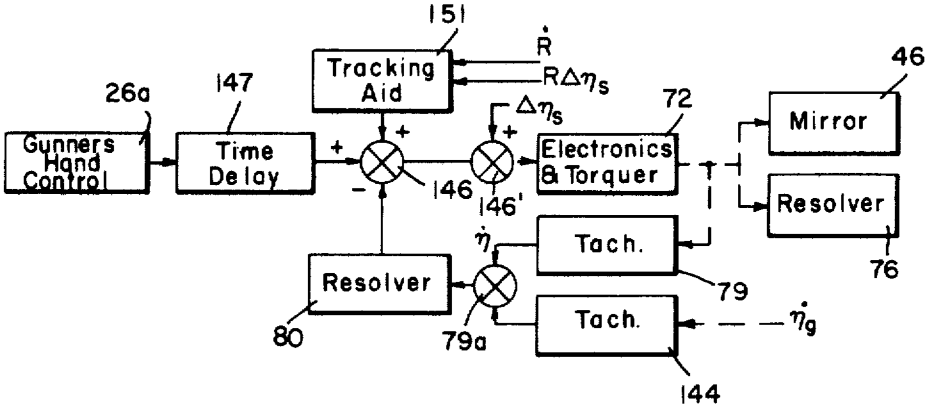
FIG. 14 is a block diagram showing details of the azimuth tracking loop for sight servo control.

As explained above the quadrant logic circuitry 52 is designed to convert the detector signals to line of sight position error commands as its outputs. These error signals are indicated in FIG. 7*a* as $\Delta\epsilon_s$ (the error in the elevation angle of the line of sight) and $\Delta\eta_s$ (the error in the azimuth angle of the line of sight). These error commands are supplied to the tracking aid circuits as shown in FIGS. 13 and 14 via summers 141' and 146'. Their outputs in turn control the torquers which control the position of the gimballed mirror 46 in the sight housing as also shown in FIGS. 4 and 9*a*. The torquers 72 and 73 are responsive to either tracking commands or to manually generated slewing commands from the gunner or to both as seen in FIG. 15. They position the mirror 46 so as to point the combined optical axes at the target. Synchro-type resolvers and tachometers which are incorporated into the pointing apparatus of FIG. 9a send voltages representing angles (sight elevation angle $\epsilon_s$ and sight azimuth angle $\eta$ and corresponding angle time rates) to the fire control computer 30. The inside gimbal axis of the mirror pointing mechanism is the elevation axis so that the choice will match the inside-outside relationship of the gun servo axes in the movable gun platform 10.

The gun and sight are sufficiently close to each other so that for all practical purposes in considering the geometry of the system they may be considered as a single point and are conveniently taken as the origin of the coordinate systems used in the computations. In fact the gunner sits behind the gun and his line of sight and the gun axis have a parallax separation of about one meter. Before turning to a detailed discussion of the computations and the circuits implementing them, it will be helpful to further consider the relationship of the geometry of the system to two of the sets of coordinate axes used in the computations.

In FIG. 9a these relationships are diagrammatically illustrated. It will be noted that the local level coordinates have a set of axes $x_0$, $y_0$, and $z_0$ as defined above (but here seen from a different point of view) with its origin at the point O which is the above-noted origin point considered to be the position of the sight and the firing point of the gun itself. The $x$, $y$ plane of this set of axes is illustrated for convenience as being defined by the plane of the platform 10 on which the gun and the control unit are mounted as discussed above, but it will be understood that this set of axes does not rotate with platform 10.

It will be further noted that the vertical standard 70 on which the gimbal member 71 supporting the gimballed mirror 46 is mounted for rotation about standard 70 is coincident with the $z_o$ axis and parallel to the direction indicated by the arrow 66*a* previously defined in connection with the vibration isolation apparatus. This direction is of course the vertical with respect to the gun platform or any plane parallel to it and in the static case it is the direction of the gravitational vector with respect to the local horizontal. The mirror 46 is gimballed to be controlled by a first DC torquer 72 which rotates the mirror about the $z_o$ axis in order to define the sight azimuth deflection angle $\eta$ (measured with respect to the gun azimuth deflection angle $\eta_g$). The line of sight, LOS, azimuth angle $\eta_s$ to the target (with respect to the fixed inertial axis $x_o$) is given by $\eta_s = \eta_g + \eta$. A second DC torquer 73 rotates the mirror 46 about an elevation axis which lies along or parallel to the $x_o$ axis for zero deflection and which remains perpendicular to the line of sight, LOS, as deflection $\eta_s$ changes. The actual physical elevation axis is thus the intersection of the plane of the mirror 46 with a plane parallel to the $xy$ plane and passing through the gimbal mirror supports. When the azimuth or deflection angle $\eta_s$ is zero, the elevation axis of course lies along the $x_o$ axis if we neglect the vertical displacement of the gimbals from the $xy$ plane as diagrammatically shown in FIG. 9a.

However, when, as illustrated in FIG. 9a the mirror has been rotated through an azimuth angle $\eta$ in the $x$-$y$ plane so that axis $x_o$ moves to $x_f$ and then through an elevation angle $E_s$, the elevation axis will itself have been rotated through angle $\eta$ and will assume the position of the axis $x_f$ in FIG. 9a which is perpendicular to the line of sight, LOS. LOS is also indicated in FIG. 9a as the axis $y_f$. Of course, the same angular transformations will have been performed on the $z$ axis and will result in its rotation through an angle $\epsilon_s$ to the position $z_f$ as shown in FIG. 9a, mutually perpendicular to $x_f$ and $y_f$.

As noted above, it has been conventional in vector analysis to identify this rotating set of axes having $y_f$ lying along the line of sight, LOS, as the R, E, D coordinate system where R is the unit vector directed along the line of sight or $y_f$ axis, E is a unit vector directed along the elevation axis, $x_f$, perpendicular to R, and D is a third unit vector perpendicular to R and E and thus being directed along $z_f$, the three vectors having a common origin 0'. This R, E, D, or $x_f$, $y_f$, $z_f$ coordinate system moves as the mirror moves and is always positioned so that the axis R lies along the line of sight, LOS, to the target. The original $x_o$, $y_o$, $z_o$ set of axes, of course, is a fixed inertial coordinate system having the $xy$ plane in the local horizontal with the x direction arbitrarily chosen as a fixed zero reference point.

To be precise, both the origin 0 of the inertial or $x_o$, $y_o$, $z_o$ coordinate system and the origin O' of the moving R, E, D or $x_f$, $y_f$, $z_f$ coordinate system should be deemed to be located at the point 46*a* where the line of sight, LOS, impinges on mirror 46. The translational displacements from 46a shown diagrammatically in FIG. 9a, however, are irrelevant to the present discussion of the rotational relationship of the two coordinate systems.

It should also be noted that the actual angles through which the gimballed mirror 46 is physically moved are only one half $\eta$ or $\epsilon_s$ due to the mirror law of reflection. That is to say, in order for the image of the target to be received by the mirror 46 along the line of sight, LOS, and to be reflected in the horizontal plane into the telescope lens system 45 and onto mirror 42, it is only necessary to move the mirror through one half of the actual elevation angle $\epsilon_s$. Similar considerations also apply with respect to the mirror and the deflection angle $\eta_s$. The resolvers 74 and 75, however, which are connected to provide read-outs of the elevation angle are calibrated by 2-1 gearing so as to read the actual elevation angle $\epsilon_s$ directly.

Similarly, resolvers 76 and 77*b* are provided to provide output signals representing the differential azimuth angle $\eta$. Resolver 76 is used in the lead angle computation, which requires functions of the angle $\eta$. The tracking aid requires functions of the angle $\eta_2$. These are obtained by electrically summing the signals of resolver 77*b* with a set of signals derived from a resolver 77*a* which is driven from the gun azimuth axis. A tachometer 78 is also provided and is connected to read the angular velocity $\omega_E$ about the elevational axis E or $x_f$. A second tachometer 79 is connected to provide an output signal which is representative of the angular velocity $\eta$.

The signal $\eta$ which is the azimuth lead angle and is equal to $\eta_s - \eta_g$, (the difference between the sight angle and the gun angle) is differentiated by tachometer 79 to produce output $\dot{\eta}$. Output $\dot{\eta}$ is electrically summed with the gun's azimuthal angular velocity $\dot{\eta}_g$ (provided by a tachometer mounted on the gun platform azimuth axis) by an adder 79*a* to provide $\dot{\eta}_s$, the azimuthal velocity of the sight line in the inertial coordinate system. Resolver 80 which is driven by the elevation axis drive is used to electrically multiply the term cosine $\epsilon_s$ by $\dot{\eta}_s$ to produce output $\omega_D$, the angular velocity about the deflection axis D in the R, E, D moving coordinate system.

Figure 9B:
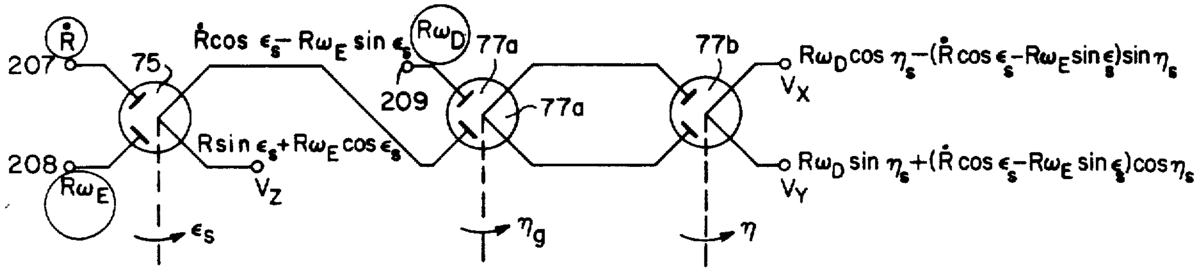
FIGS. 9*b*, and 9*c* are circuit diagrams of tracking aid circuit configurations for performing necessary transformations between the two coordinate systems shown in FIG. 9*a*.
Figure 9C:
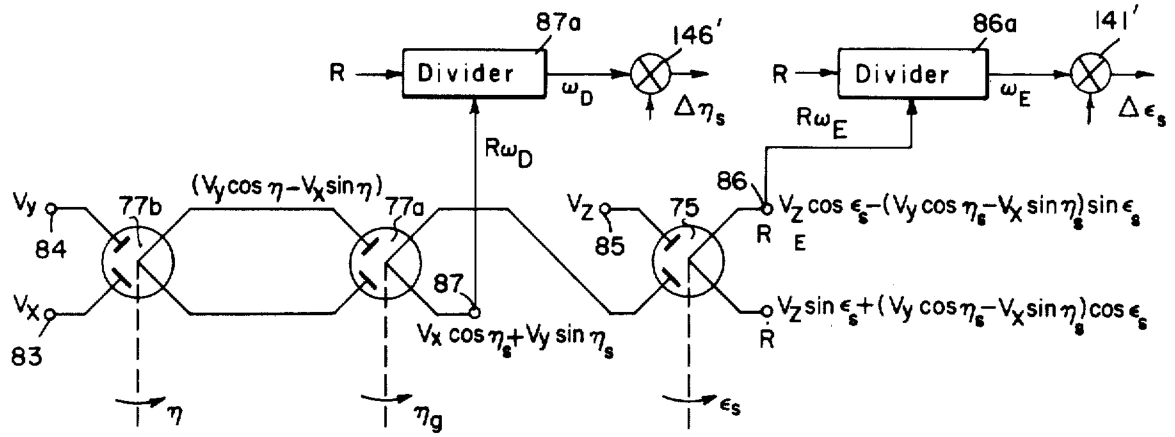
Figure 9D:
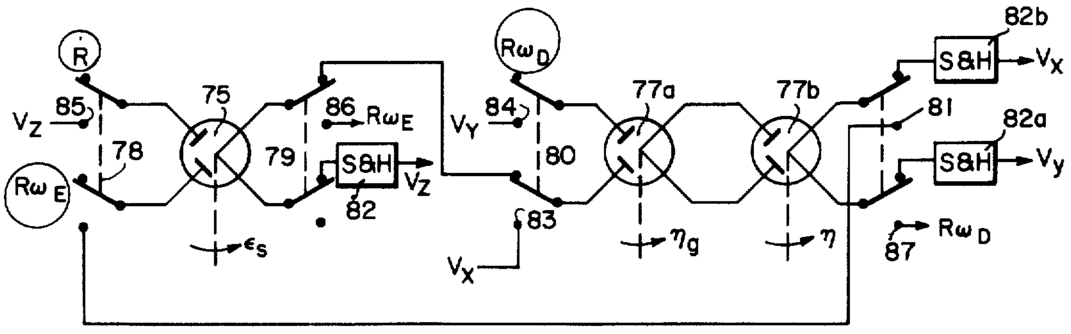
FIG. 9*d* is a circuit diagram of tracking aid circuitry having alternate relay positions, one of which results in the circuit of FIG. 9*b* and the other of which results in the circuit of FIG. 9*c*.

Turning for the moment to FIG. 9d there is shown a detailed circuit diagram of the tracking aid circuitry much of which is physically contained in computer 30. The resolvers 75 and 77*b* are the resolvers which have been discussed in connection with FIG 9*a* providing measures of the elevation angle $\epsilon_s$ and the deflection angle $\eta$ respectively. A relay having multiple poles 78, 79, 80 and 81 is shown as being in the manual tracking position utilized by the gunner during the acquisition phase. The portion of the circuit thus activated is reproduced separately in FIG. 9*b*. That is to say the relay poles in FIG. 9*b* are in a position they occupied before the gunner has activated the tracking circuitry. The circled quantities $\dot{R}$, $R\omega_E$, and $R\omega_D$ are the input voltages to the tracking circuit. These three quantities are, of course, the three components of the target's velocity vector along the R, E, and D axes respectively. They are available as outputs from computer 30 as shown in FIG. 11. The circuit of FIG. 9*d* produces as outputs the quantities $V_z$ which is derived from a sample and hold circuit 82 which is connected to one output of resolver 75, the quantity $V_y$ which is derived from the sample and hold circuit 82a connected to one output of resolver 77b and the quantity $V_x$ which is derived from the sample and hold circuit 82*b* which in turn is connected to the other output of resolver 77*b*. The circuit has thus converted the three input components of the vector velocity of the target measured in the R, E, D coordinates, to equivalent velocity component expressed in the $x$, $y$, $z$ coordinate system.

When the relay is activated so as to place the poles 78, 79, 80 and 81 in the alternative position to that shown in FIG. 9d the inputs become the quantities $V_x$, $V_y$, and $V_z$ derived from the sample and hold circuits 82*a*, 82*b*, and 82 and applied respectively through terminals 83, 84, and 85 as shown separately in FIG. 9*c*. The outputs are then the quantities $\omega_E$ derived from divider 86*a* and $\omega_D$ derived from divider 87*a*.

The relationship between the quantities discussed in connection with the geometric diagram of FIG. 9*a* and in connection with the circuit diagrams of FIGS. 9*b*, 9*c*, and 9*d* may more formally be described by the following matrix transformations.

$$\begin{bmatrix} X_o \\ Y_o \\ Z_o \end{bmatrix} = \left[\begin{array}{c|cc|cc} \cos\eta_s & -\sin\eta_s & \cos\epsilon_s & \sin\epsilon_s & \sin\epsilon_s \\ \sin\eta_s & \cos\eta_s & \cos\epsilon_s & -\cos\eta_s & \sin\epsilon_s \\ 0 & \sin\epsilon_s & & \cos\epsilon_s & \end{array}\right] \begin{bmatrix} X_f \\ Y_f \\ Y_f \end{bmatrix}$$

Eq (28)

$$\begin{bmatrix} X_f \\ X_f \\ Z_f \end{bmatrix} = \left[\begin{array}{cc|cc|c} \cos\eta_s & & \sin\eta_s & & 0 \\ -\sin\eta_s & \cos\eta_s & \cos\eta_s & \cos\epsilon_s & \sin\epsilon_s \\ \sin\eta_s & \sin\epsilon_s & -\cos\eta_s & \sin\epsilon_s & \cos\epsilon_s \end{array}\right] \begin{bmatrix} X_o \\ Y_o \\ Z_o \end{bmatrix}$$

Eq (29)

The vector equivalencies indicated in Equations(30) and (31 ) below are used to make substitutions in the left-hand side of equations (28) and (29) above to get to either desired mode of expression depending upon which quantity and which coordinate system is being considered.

$$x_o = V_x \; Y_o = V_y \; Z_o = V_z \qquad \text{Eq (30)}$$

$$X_f = R\omega_D \; Y_f = \dot{R} \; Z_f = R\omega_E \qquad \text{Eq (31)}$$

The first type of transformation, that is, from the R, E, D measured rates to $x$, $y$, $z$ velocity components is governed by the relationships set forth in Equation 32 below.

$$\begin{bmatrix} V_x = & R\omega_D \cos\eta_x - & (\dot{R}\cos\epsilon_x - R\omega_E \sin\epsilon_x)\sin\eta_x \\ V_y = & R\omega_D \sin\eta_x + & (\dot{R}\cos\epsilon_x - R\omega_E \sin\epsilon_x)\cos\eta_x \\ V_z = & \dot{R} \quad \sin\epsilon_x + & R\omega_E \cos\epsilon_x \end{bmatrix} \text{Eq (32)}$$

The mechanization of these equations is shown in FIG. 9c.

The second type of transformation which may be necessary, that is from clamped $x$, $y$, $z$ velocity components back to R, E, D rates is governed by the equations set forth below as Equation 33.

$$\begin{bmatrix} R\omega_D = V_x \cos\eta_x + & V_y \sin\eta_x \\ \dot{R} \quad = V_z \sin\epsilon_x + & (V_y \cos\eta_x - V_x \sin\eta_x)\cos\epsilon_x \\ R\omega_E = V_z \cos\epsilon_x - & (-V_x \sin\eta_x + V_y \cos\eta_x)\sin\epsilon_x \end{bmatrix} \text{Eq (33)}$$

This transformation mechanization is illustrated in the circuit diagram of FIG. 9*b*.

A more complete general discussion of the mathematics of coordinate rotation equations and transforms may be found in a book entitled "Classical Mechanics" written by Herbert Goldstein and published by Addison Wesley in 1950.

Before turning to a detailed discussion of the manner in which these relationships and transformations are used in the tracking aid portion of the computational system, it will be helpful to deal first with another ancillary matter. In order to solve the lead angle equations set forth above, (and which are mechanized in loops separate from the tracking aid circuitry discussed above) it was pointed out that values of time of flight, $T_f$, of the gun projectile to the target and values of the superelevation, $\epsilon_o'$ (that is, the additional angular increment required to offset gravity drop) as a function of range at intercept, $R_i$ are required. Using some representative data derived from empirical measurements on a modern 20 mm gun, it was found that the ballistic data could be mechanized with fairly simple function generators. This mechanization is illustrated in the circuit diagrams of FIGS. 12*a* and 12*b*.

Using the numerical values at an elevation angle of 35° as a nominal set of requirements, time of flight is taken as a constant with respect to elevation angle, and superelevation is computed by multiplying the horizontal value of superelevation by cosine $\epsilon_T$, where $\epsilon_T$ is the elevation angle of the gun in $x$, $y$, $z$ coordinates. Correction for different ammunition of course requires substitution of different constants. However, correction for nonstandard atmospheric conditions may be handled by adjustment of scaling potentiometers operating directly on the outputs of the circuits shown in FIGS. 12a and 12b.

A tabulation of the required values and approximation errors in Equations 7) and 8) (at 0° elevation) is given in Table II below.

TABLE II

| Range (Meters) | Elevation (mr) | Error in Elevation (mr) | Time of Flight (sec) | Error in time of Flight (sec) |
|---|---|---|---|---|
| 100 | 0.5 | +0.09 | 0.097 | −0.012 |
| 200 | 1.0 | +0.02 | 0.198 | −0.009 |
| 300 | 1.5 | −0.02 | 0.304 | −0.005 |
| 400 | 2.0 | −0.01 | 0.415 | −0.001 |
| 500 | 2.6 | −0.06 | 0.530 | 0 |
| 600 | 3.2 | −0.06 | 0.652 | +0.002 |
| 700 | 3.9 | −0.10 | 0.780 | +0.003 |
| 800 | 4.6 | −0.08 | 0.914 | +0.002 |
| 900 | 5.4 | −0.09 | 1.057 | +0.002 |
| 1000 | 6.2 | −0.04 | 1.208 | 0 |
| 1100 | 7.1 | +0.01 | 1.370 | 0 |
| 1200 | 8.1 | +0.02 | 1.543 | −0.002 |
| 1300 | 9.2 | +0.05 | 1.729 | −0.002 |
| 1400 | 10.4 | +0.09 | 1.930 | 0 |
| 1500 | 11.7 | +0.11 | 2.146 | 0 |
| 1600 | 13.2 | +0.05 | 2.380 | +0.002 |
| 1700 | 14.8 | +0.11 | 2.631 | 0 |
| 1800 | 16.7 | +0.05 | 2.901 | −0.003 |
| 1900 | 18.7 | +0.05 | 3.188 | −0.014 |
| 2000 | 21.0 | −0.04 | 3.490 | −0.039 |

Figure 12A:
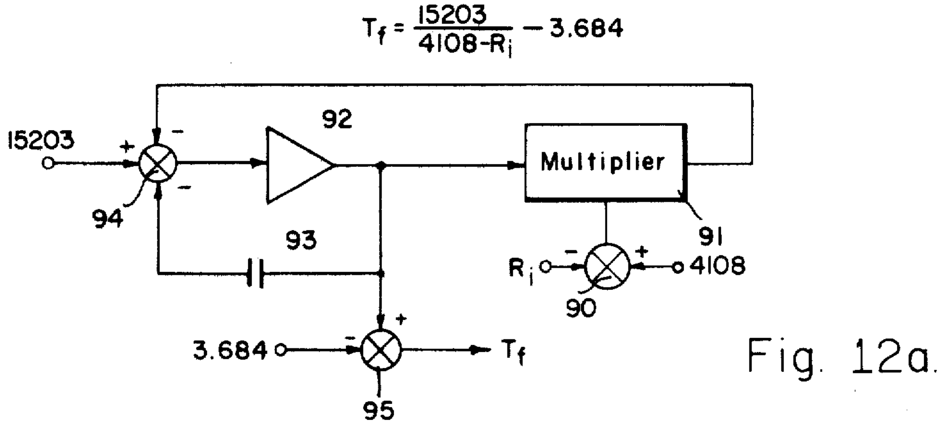
FIG. 12*a* and 12*b* are circuit diagrams of the function generators shown in FIG. 11.
Figure 12B:
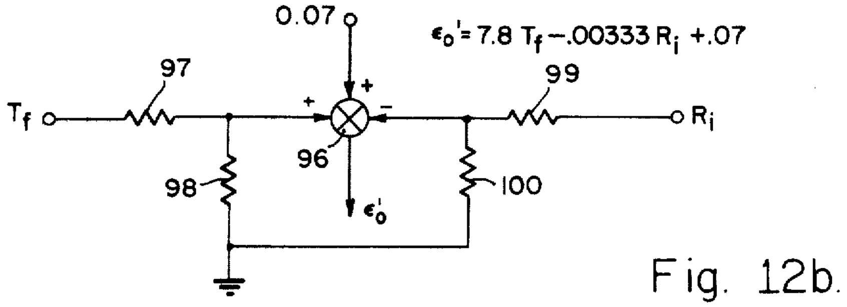

The mechanization of a function generator for producing voltages to represent this data is shown in FIGS. 12*a* and 12*b*. From FIG. 12a it will be noted that the time of flight can be determined from the following equation.

$$T_f = \frac{15203}{4108 - R_i} - 3.684 \qquad \text{Eq (34)}$$

The implementation of this equation is shown in circuit diagram of FIG. 12*a* wherein the adder 90 has the variable range at intercept, $R_i$, applied to a negative input terminal and the constant 410S applied to a positive input terminal. The output of the adder 90 is supplied as one input to a solid state multiplier 91. The other input to the multiplier 91 is the output of amplifier 92. Amplifier 92 is of course an operational amplifier and uses a feedback loop 93 connecting its output to the negative input of an adder 94. The output of multiplier 91 is also connected as feedback to another negative input adder 94. The third input to a positive terminal of adder 94 is the numerator of the fraction, which is 15203. The output of adder 94 is applied as input to amplifier 92, the output of which is in turn applied as the second input to multiplier 91. The output of amplifier 92 is also applied to a positive input terminal of adder 95 which has the constant 3.684 applied to a second negative input terminal. It can then be shown that the output of adder 95 will be the quantity $T_f$ as defined by Equation 34) for varying values of range $R_i$ as shown in Table II. The circuit uses a multiplier in the feedback loop of an operational amplifier to achieve a division in a manner such as used in circuits shown in Motorola's catalogue and identified as a 1595C multiplier.

The general principles underlying operation of analog computer circuits of the type shown, for example, ir FIG. 12*a*, and used throughout the system, are dealt with in many available textbooks. These include a book entitled "Computation by Electronic Analog Computers" written by V. Borsky and J. Matyas and published by Iliffe Books Ltd. of London in 1968. Additional information is available in a book entitled "Fundamental Analog Techniques" by R. J. A. Paul, published by the MacMillan Co. of New York in 1966. Alternatively, reference may be made to a book entitled "Analog and Hybrid Computing" by D. E. Hyndman, published by the Pergamon Press, Oxford, England in 1970. State of the art techniques as represented in the teachings of such textbooks will not be dealt with in detail herein.

Turning now to FIG. 12b there is shown a circuit which will generate values of the superelevation angle as a function of time of flight and range at intercept in accordance with the following equation.

$$\epsilon_o' = \mathbf{7.8}T_f - \mathbf{0.00333}R_i + 0.07 \qquad \text{Eq. (35)}$$

The circuit mechanizing or implementing Equation 35) is shown in FIG. 12*b*. It will be noted that values of $T_f$, which are derived from the adder 95, are applied by a resistive coupling network to a positive input of the adder 96. The resistive network comprising resistors 97 and 98 is, of course, so proportioned in value and so connected as to generate the constant 7.8 by which the term $T_f$ is multiplied. Similarly, values of range at intercept, $R_i$, are applied through a coupling network comprising resistors 99 and 100 which are so proportioned in value and so connected as to multiply the variable values of $R_i$ by the constant factor 0.00333. The output of that network is then applied to a negative input terminal of the adder 96. A third input of a voltage representing the constant term 0.07 is applied to another positive input of the adder 96. The output of adder 96 is now, of course, a voltage representing the superelevation, $\epsilon_o'$. The values of superelevation and time of flight as a function of range are used in order to solve the lead angle equations which define the angle $\eta$ (the azimuth lead angle which is the difference between $\eta_s$, the sight azimuth angle and $\eta_g$, the gun azimuth angle both relative to a fixed reference $x_o$) and the angle $\epsilon_T$ (the required elevation angle of the gun). Angles $\eta$ and $\epsilon_T$ are used to generate gun commands.

Figure 10:
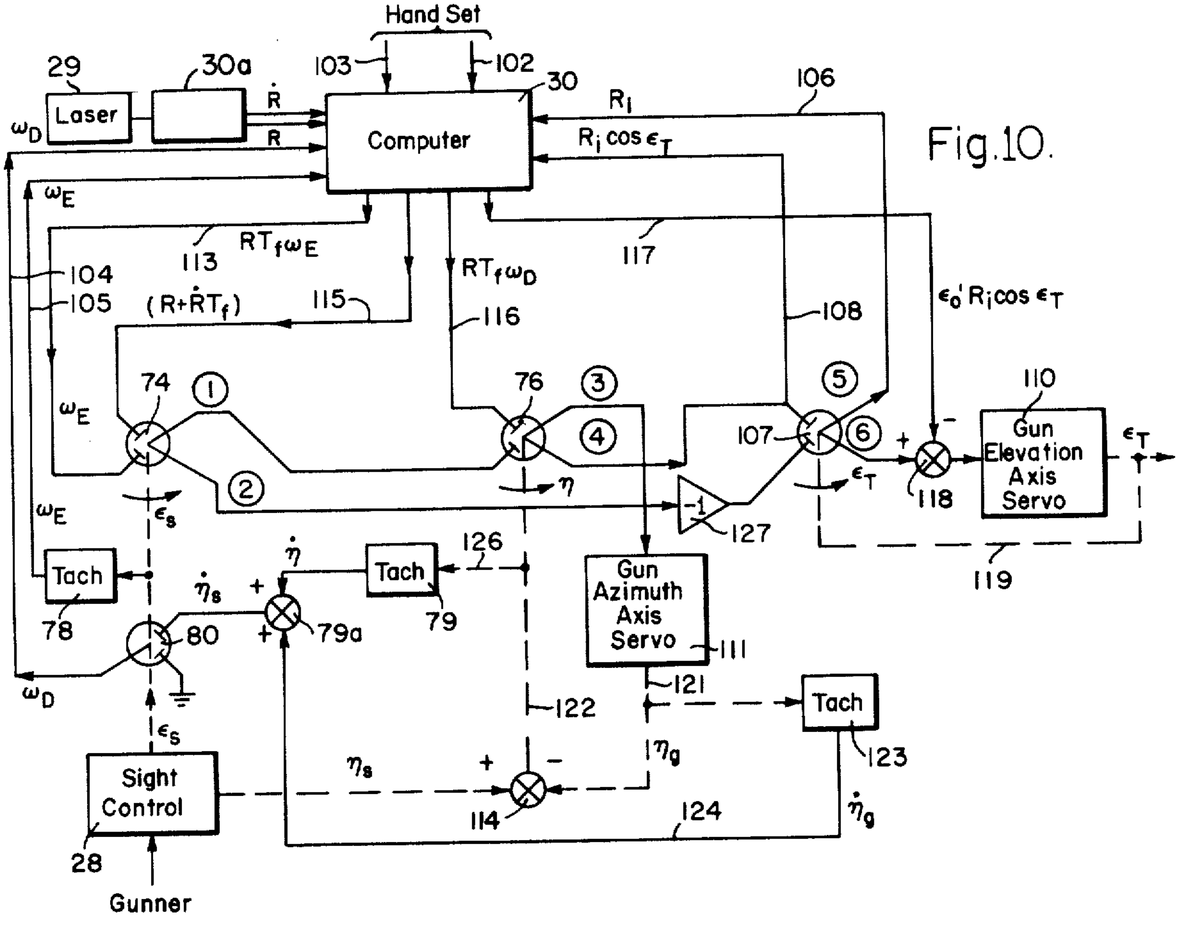
FIG. 10 is a computational schematic for the system as a whole.

The overall computational schematic by which the lead angle equations are solved and the resulting pointing commands generated for the gun servos is shown in FIGS. 10 and 11. In considering the lead angle Equations 25), 26) and 27) which, for convenience are rewritten below as Equations 35), 36) and 37), it should be borne in mind that the gun is mounted on an outer azimuth gimbal which has been represented in FIG. 2*a* as the gun platform 10. Thus, the gunner and control unit (including the sighting telescope) being mounted on this outer azimuth gimbal, rotate with the gun platform through an angle $\eta_g$. By virtue of the gimballed mirror 46, however, the sight has its own azimuth axis for providing additional or differential deflection $\eta$. The addition of these two rotations is shown symbolically in FIG. 10 by adder 114. The gun is also provided with an inner elevational gimbal under the control of the gun servo motors. The sight is also driven about an inner elevational gimbal axis by torquer 73 to produce a correspondence of geometry, but it will be noted that there is no coupling between the elevation of the gun and that of the sight; that is to say, the sight does not move in elevation in response to elevation movements of the gun as it does with respect to azimuth. For consistency the term $(\epsilon_o + \epsilon_l)$ of the general equations is here replaced by $\epsilon_T$.

The three simultaneous equations defining the required gun lead angles are then as follows:

$$R_i = (A \cos \eta + RT_f\omega_D \sin \eta) \cos \epsilon_T + C \sin \epsilon_T \qquad \text{Eq (35)}$$

$$O = RT_f\omega_D \cos \eta - A \sin \eta \qquad \text{Eq (36)}$$

$$O = (A \cos \eta + RT_f\omega_D \sin \eta) \sin \epsilon_T - C \cos \epsilon_T - \epsilon_o R_i \qquad \text{Eq (37)}$$

In these equations quantities A and C have been defined above in Equations 23) and 24) as

| | | | |
|---|---|---|---|
| A | = | $(R + \dot{R}T_f) \cos \epsilon_s - RT_f\omega_E \sin \epsilon_s$ | |
| C | = | $RT_f\omega_E \cos \epsilon_s + (R + RT_f) \sin \epsilon_s$ | |
| R | = | Range to target along line of sight, LOS | In R, E, D coordinates |
| $\dot{R}$ | = | Range rate, i.e., rate of change of range | |
| $\omega_D$ | = | Line of sight rotational rate in deflection | |
| $\omega_E$ | = | Line of sight rotational rate in elevation | |
| $T_f$ | = | Time of flight to intercept | Scalar |
| $R_i$ | = | Range to intercept | $R_I$ $E_I$ $D_I$ coordinates |
| $\epsilon_s$ | = | Elevation angle of sight (zero when sight line is horizontal) | In x,y,z, coordinates |
| $\eta_g$ | = | Azimuth rotation of gun (relative to some ground reference) | |
| $\eta_s$ | = | Azimuth rotation of sight (relative to same reference as gun) | |
| $\eta$ | = | Azimuth lead angle $(= \eta_s - \eta_g)$ | |
| $\epsilon_o'$ | = | Superelevation (for horizontal plane target) | |
| $\epsilon_T$ | = | Gun elevation angle | |

The three dependent variables being solved for in the above Equations 35), 36), and 37) are, of course, range to intercept $R_i$; azimuth lead angle, $\eta$; and gun elevation angle, $\epsilon_T$. From the computational schematic shown in FIG. 10 it will be noted that the laser unit 29 provides input data from which continuous values of the range, R, and range rate $\dot{R}$ are derived in accordance with techniques set forth above in connection with FIGS. 7*a* and 7*b*. Voltages representative of their value are supplied to the computer 30 which in turn contains mechanizations of solutions for the above equations. Values of $\omega_D$ and $\omega_E$ are derived from the sight tracking loop which includes the instrumentation associated with the mirror as shown in FIGS. 9*a* and 10. Inputs $\dot{R}$, R, $\omega_D$, and $\omega_E$ together with values of $T_f$ derived from its function generator are used to solve equations 35), 36) and 37) for their dependent variables $R_i$, $\eta$ and $\epsilon_T$.

In operation nonstandard conditions, such as for variation in ammunition or for atmospheric meteorological variations, are set into computer 30 by handset controls on the control panel 26 and are represented in FIG. 10 by the handset lines 102 and 103. The sight control unit 28 is operated by the gunner as discussed above. It will be recalled from FIG. 9*a* that the sight control resolvers 74 and 75 generate voltages representative of values of the angle of elevation of the sight, $\epsilon_s$, and that the resolver 76 and 77*b* generate values representative of the azimuth lead angle $\eta$. In FIG. 10 the output $\eta_s$ from sight control unit 28 is shown applied to a positive input of adder 114 whereas the output $\epsilon_s$ is shown applied to resolver 80. It will be recalled that adder 114 is not actually an electronic adder but is shown as a convenient diagrammatic representation to show the effect of mechanical motions of the sight in azimuth relation to the gun platform which is also rotating in azimuth. The output of resolver 80 (as noted above) is a voltage representative of the line of sight rotational rate in deflection $\omega_D$ which is applied via line 104 as another input to the computer 30. A signal representative of line of sight rotational rate in elevation, $\omega_E$ is also applied as an input to the computer 30 over line 105 which is derived as an output from tachometer 78. A signal representation of the term $R_i \cos \epsilon_T$ is derived as an output from resolver 76. This signal is applied as an input to the computer 30 over line 108 and as an input to the gun elevation axis resolver 107.

Laser range data is processed in the computer 30*a* of FIG. 7*a* to produce filtered range rate. Both range and range rate are then converted from digital to analog signals. As the gunner controls his sight to track the target, the resolvers on each axis are driven. A tachometer 78 on the sight elevation axis provides the $\omega_E$ signal. The $\omega_D$ signal is obtained by summing the gun azimuth rate, $\dot{\eta}_g$ with the sight's differential azimuth rate, $\dot{\eta}$, in a summing device 79a and multiplying the result by cosine $\epsilon_s$ in resolver 80.

The equation solutions are implicit, with the output of the gun's elevation servo 110 being fed back through resolver 107 to provide an output, $R_i$ which is applied to computer 30 along line 106 to be fed back through the function generators to scale the input functions.

As an aid in tracing the computational flow, the resolver outputs in FIG. 10 are identified with circled numbers. The corresponding analytical expressions for the quantities represented by voltages comprising the resolver outputs along the line indicated are as follows.

① $[(R + \dot{R}T_f) \cos \epsilon_s - RT_f\omega_E \sin \epsilon_s] = A$

② $[RT_f\omega_E \cos \epsilon_s + (R + \dot{R}T_f) \sin \epsilon_s] = C$

③ $RT_f\omega_D \cos \eta - A \sin \eta$

④ $RT_f\omega_D \sin \eta + A \cos \eta$

⑤ $(RT_f\omega_D \sin \eta + A \cos \eta) \cos \epsilon_T + C \sin \epsilon_T = R_i$ ⑥ $(RT_f\omega_D \sin \eta + A \cos \eta) \sin \epsilon_T - C \cos \epsilon_T$ The analytical expression relating $R_i$ and the gun elevation angle set forth in Equation 35) was derived from the kinematic considerations discussed in connection with FIG. 1a. As pointed out above an additional correction for superelevation is necessary, and can be added to the kinematically derived elevation angle.

$$\epsilon_T = \epsilon_i + \epsilon_o$$

where $\epsilon_i$ is the kinematic term and $\epsilon_o = \epsilon_o' \cos \epsilon_T$ and $\epsilon_o' = f(R_i, T_f)$ If the mechanization were explicit, the term $\epsilon_o$ could be directly added as a bias at the output of the computer. Since this is not the case, some trigonometric manipulation is required. The output signal at ⑥ is of the form $$-C \cos \epsilon_T + M \sin \epsilon_T$$

where C is defined by ②, and $M = RT_f\omega_D \sin \eta + A \cos \eta$ (output ④) the output signal at ⑤ is $$(M \cos \epsilon_T + C \sin \epsilon_T) = R_i$$

$$M \sin \epsilon_T \approx M \sin \epsilon_i + \epsilon_o M \cos \epsilon_i$$

$$C \cos \epsilon_T \approx C \cos \epsilon_o C \sin \epsilon_i$$

The signal output at ⑥ can then be expressed as $$M \sin \epsilon_T - C \cos \epsilon_T = M \sin \epsilon_i - C \cos \epsilon_i + \epsilon_o$$

$$(M \cos \epsilon_i + C \sin \epsilon_i) = M \sin \epsilon_i + \epsilon_o R_i$$

The correction term to $R_i$ is given by $$\epsilon_o R_i = \epsilon_o' R_i \cos \epsilon_T$$

If there were no superelevation correction, the gun elevation servo would drive output ⑥ to zero. At this point, output ⑤ would represent the magnitude of a vector whose components were inputs ④ and −②. Since the correction term for superelevation is small (6.2 *mr* at 1000 meters), the vector resolution is still sufficiently accurate when output ⑥ is not quite zero. Then input ④ is given by $$M = R_i \cos \epsilon_T$$

The mechanization can then be accomplished by multiplying resolver output ④ by $\epsilon_o'$ and summing this product with output ⑥. When the gun elevation servo drives the sum to null, the desired elevation angle $\epsilon_T$ will be produced Circuitry is provided in the hybrid computer 30 for producing implicit solutions of the three simultaneous equations set forth as Equations 35), 36) and 37) above making use of inputs as provided by the hand set controls of the operator on lines 102 and 103, from the laser 29 and range computer 30a, along lines 104 and 105 from the sight resolver and tachometer, and along lines 106 and 108 from the gun elevation axis resolver 107 and from resolver 76 respectively.

An output voltage from computer 30 representative of the value of $RT_f\omega_E$ is applied along line 113 to resolver 74. A second output signal from computer 30 is applied along line 115 to a second input of the resolver 74. This signal is representative of the quantity $(R + \dot{R}T_f)$. A third output from computer 30 is applied along line 116 to an input of resolver 76 and is representative of the value of $RT_f\omega_D$. A fourth output from computer 30 is applied along line 117 to a negative input of a summing device 118. This signal is representative of the value of $\epsilon_o' R_i \cos \epsilon_T$. The other input to the summing device 118 is applied to its positive terminal and comprises the output identified as output number ⑥ above from resolver 107. The sum of these two terms is applied to the input of the gun elevation axis servo 110. A feedback signal representative of the actual gun elevation angle, $\epsilon_T$, is produced by positioning of the resolver 107 as indicated by the dashed line 119.

The gun azimuth axis servo 111 is driven by output number 3 from revoler 76 which is applied to it over line 120.

As indicated by dashed line 121, the gun azimuth axis servo 111 also provides a feedback signal representative of the gun azimuth angle $\eta_g$ to the negative input of adding device 114 which has a signal representative of the sight azimuth applied to its other positive input. The output $\eta$ of adder 114 is applied along line 122 to drive resolver 112 to a representation of the angle $\eta$. Adder 114, it will be recalled, is in fact a representation of the azimuthal addition performed by rotation of the sight unit in unison with the gun platform as indicated by the dashed signal lines representing a mechanical connection.

Feedback is also applied from gun azimuth axis servo 111 to tachometer 123 which generates an output signal along line 124 representative of the rate of change of the gun azimuth angle, $\dot{\eta}_g$. This signal is applied as shown to the positive input of adder 79a which has applied to its other positive input a signal representative of $\dot{\eta}$ generated by tachometer 79 which is driven by the signal $\eta$ taken from the summing device 102 along lines 122 and 126.

Considering now the resolver outputs which have been set forth analytically above it will be noted from FIG. 10 that output number ① which is derived from resolver 74 is applied as an input to resolver 76; output number ② which is derived from resolver 74 is applied through inverter 127 to an input of resolver 107; output number ③ is derived from resolver 76 and is applied to the gun azimuth axis servo 111; output number ④ is also derived from revolver 76 and is applied both as an input to resolver 107 and along line 108 to computer 30; finally, output number ⑤ is derived from resolver 107 and is applied along line 106 as an input to computer 30.

More specific details of certain ones of the computational circuits of the computer 30 are shown within the dashed block 30 in FIG. 11. Additional circuitry such as the tracking aid circuits described above which is physically located on separate circuit boards in computer 30 are omitted from FIG. 11 for clarity. It will be noted from FIG. 11 that the computer 30 also includes the function generators 128 which produces the signal $T_f$ and 133 which produces signal $\epsilon_o'$. The details of these function generators have been previously described in FIGS. 12*a* and 12*b* respectively.

Other details of computer 30 are also shown in FIG. 11. The inputs to the computer are analog signals from the laser range and range rate computer 30a representing R and $\dot{R}$. From the tachometers on the sight servos, signals are derived proportional to $\omega_D$ and $\omega_E$. A signal is provided from the azimuth sight resolver representative of $R_i \cos \epsilon_T$. An input signal proportional to $R_i$ is also provided from the gun elevation axis resolver 107. Within the computer 30 the range signal R is multiplied by $\omega_E$ in multiplier 200, and by $\omega_D$ in multiplier 201. The outputs of multipliers 200 and 201 are fed to multipliers 204 and 205 where they are multiplied by $T_f$. The range rate input $\dot{R}$ is multiplied by $T_f$ in multiplier 202 and summed with R in adder 206 to provide the signal on line 115. The input $R_i \cos \epsilon_T$ is multiplied by $\epsilon_o'$ in multiplier 203.

As has been noted, the system described above used a director sight mechanization wherein the gunner first acquires the target and then uses a computer generated program to aid him in tracking. The gunner observes the difference between the required and actual line of sight turning rate as an error angle in his sight indicated by the target being outside the 3 milliradian circle 210 in FIG. 6. He uses his hand control to generate voltage commands to the sight servos to reduce this error to zero. DC torquers rather than AC servo motors are used because of the large dynamic range required. DC tachometers are used to generate the feedback signals and to provide the values of $\omega$ necessary in the lead angle computations.

More detailed block diagrams of the elevation and azimuth tracking loops also included in the computer 30 are shown in FIGS. 13 and 14 respectively. The elevation loop requires only a single tachometer feedback term since the sight and gun elevation channels are uncoupled. The azimuth loop requires that the gun and sight rates be summed and multiplied by cos $\epsilon_s$ to generate the correct rate feedback term. Thus, in FIG. 13 the gimballed mirror 46 is driven by the DC torquer 73 about the elevation axis. The DC torquer also drives a feedback tachometer 78 which in turn generates values of $\dot{\epsilon}_s$ to be applied to the negative input of summing device 141. The gunner's hand control unit 26*a* provides commands through time delay circuit 142 the output of which is the signal $\omega_E$ which is applied as a positive input to the adder 141. The time delay circuit is normally a straight through connection and only functions as a time delay during the transition from manual to aided tracking. The output of adder 141 is applied through series connected adder 141' to the electronics associated with the torquer 73 in order to correctly position the mirror 46 about the elevation axis.

Similar circuitry is provided for the azimuth tracking loop as shown in FIG. 14 where the mirror 46 is driven about the azimuth axis by the DC torquer 72 which also drives a tachometer 79 which generates the signal $\dot{\eta}$ as an output to be applied to adder 79*a*. A second tachometer 144 is mechanically driven to represent the gun azimuth rate and produces as its output a signal representative of the gun azimuth rate $\dot{\eta}_g$ which is also applied to adder 79a. The output of the adder 79*a* is applied to another resolver 80 to perform the multiplication by cos $\Gamma_s$ indicated above and shown in the circuit of FIG. 14. The adder 146 receives the output of resolver 80 as an input to its negative terminal and outputs from the gunner's hand control 26a via delay 147 to apply a signal representative of $\omega_D$ to the other positive terminal. The output of adder 146 is applied through series connected adder 146' in the closed feedback loop to drive the electronic circuitry associated with torquer 72.

It will be noted that in FIG. 13 the adder 141 in addition to the input specified above also receives an input from tracking aid circuitry 150 and in FIG. 14 the adder 146 similarly receives an input from tracking aid circuitry 151. Details of tracking air circuits 150 and 151 have been discussed above and are shown in FIG. 9*d* while quadrant error signals $\Delta\epsilon_s$ and $\Delta\epsilon_s$ are derived as shown in FIG. 7*a* and are applied through adders 141' and 146' as shown in FIGS. 9*c*, 13, and 14. The activation cycle is shown functionally in FIG. 15. Thus, tracking aid in the form of electrical commands to the azimuth and elevation tracking loops is provided in order to reduce the rather severe tracking requirements that would be imposed on the gunner in a manually operated mode. During target acquisition, the gunner feeds voltage commands proportional to $\dot{\epsilon}_s$ and $\dot{\eta}_s$ to the slight servos. These voltages also used to establish the initial conditions for the tracking aid. When the target is within the reticle's 3 milliradian circle 210 and there is no differential line of sight rate, the gunner can fire the laser and activate the tracking aid by closing switch 152. The tracking aid utilizes the laser range date in the solution of the tracking rate equations as mechanized in FIGS. 9*b*, 9*c* and 9*d*. The laser is operating at a 10 pulse per second rate. 5 laser return signals are filtered to provide smooth range and range rate data for the computer as explained in detail above. This takes 0.5 seconds, after which the tracking aid computation is started. This takes less than 0.5 seconds additional after which the control is shifted from the gunner to the tracking aid. Timing to actuate this transfer is derived in any convenient manner from the clock in computer 30 which is physically included in laser range computer 30a. An indicator (which may be any conventional type of display) in the gun sight shows the gunner when the tracking aid takes control. The maximum time is one second.

At the instant the aid takes control, time delays are activated and the gunner's hand control 26*a* is temporarily switched out of the loop for 0.25 second by the time delay. This allows time for it to return to zero. The control is then switched back in, allowing the gunner to manually trim the rate signals as required. If the tracking aid does not activate, the switch-out is inhibited. The necessity for manual trimming may arise either from a variation in the target's course from the constant velocity vector postulated, from electronic noise, from vibration, or from other minor sources of error.

While it is certainly possible for the target to perform a variety of maneuvers, the flight path can be assumed to be a constant velocity vector at least to a very good first approximation for the several seconds required to track and open fire. From instantaneous measurements of range, line of sight angles, and line of sight angular rates, as discussed above, the future line of signal angular rates can be predicted. This can be done by noting that if the target is moving at a constant velocity, its component velocities in any inertial coordinate frame will be constant. During manual track, the line of sight linear velocities are computed and transformed (through resolvers in the gunner's sight) into the inertial $x$-$y$-$z$ frame where the velocity components are constant. These components are filtered and stored. When the tracking aid is activated, the stored components are transformed back into line of sight angular rate commands $\omega_E$ and $\omega_D$ and applied through summers 141 and 146 to the tracking loops. Attention is again directed to FIGS. 9*a*, 9*b*, 9*c* and 9*d* for illustrations of the two coordinate systems and the circuitry for these tracking aid transformations between them and to FIGS. 13 and 14 for the tracking loops.

If the target is obscured whether by clouds or for any other reason, the tracking aid will continue to generate the necessary nonlinear turning rate required to maintain the target within the aiming circle when it reappears based on the velocity vector values stored in sample and hold circuits 82, 82a, and 82b which remain constant during any one tracking mode. The computer logic is mechanized to handle missed laser returns.

To further reduce the gunner's workload, and improve tracking, the quadrant track command is also provided as has been illustrated and described in connection with FIGS. 7*a* and 7*b*. These variable quadrant error signals are added to the constant vector velocity derived tracking commands in summers 141' and 146'. Once the target is acquired, the laser will automatically track it. Although it is possible to mechanize the quadrant detector circuits to give voltage error signals proportional to angular deviation, a simple onoff logic as shown in the circuitry of FIG. 7b is preferred since the additional complexity of the first alternative is not worth either the performances improvement or the cost involved.

It should be noted that both the angular rate and the quadrant track commands are necessary to make the tracking aid completely effective. The rate signals provides the smooth non-linear turning commands which permit the line of sight to follow the target even during temporary obscurations. The quadrant track signal, which only functions when the target is at least partially acquired, provides automatic trimming commands which remove the effects of line of sight shift due to either target maneuvering or inaccuracy in the tracking aid's rate signals. Finally, the gunner can add manual trimming commands.

Although the gun servos are of conventional design, some of the overall system problems should be pointed out to insure an effective control system. As noted, the system uses a director sight with the gun servo drives commanded in both rate and position. A block diagram of the servo signal flow is shown in FIG. 15. Only one channel is shown since the circuitry for azimuth and elevation control is the same. During acquisition, the gunner uses his hand control 26*a* to command a line of signal rate to the sight servo such as 72. The computer 30 commands a lead angle value of zero during this phase, so the gun line and sight line are parallel to each other. At acquistion, the gunner closes switch 152 and the tracking aid 150 takes over and initially supplies the same rate command to the sight while switching in the time delays 142–147 in series with the hand control (allowing 0.25 second for the hand control to return to zero before returning it to the control loop). The computer will also supply the correct values of lead angle to the fun servos at this time, causing the gun to slew to its proper pointing direction. There is no coupling between the elevation axes of the gun and sight, but a transient can be introduced in the sight's azimuth channel. If the azimuth lead angle command is large enough to saturate the input to the gun azimuth axis control, a gun maximum slew rate on the order of 1500 milliradians per second will be produced. Since the first order time lag of the sight servo is approximately 0.002 second, a maximum sight line shift of three milliradians will result. Actually, the quadrant tracker will limit the shift to approximately three-fourths of a milliradian. This residual error can then be trimmed out by the gunner.

Figure 16:
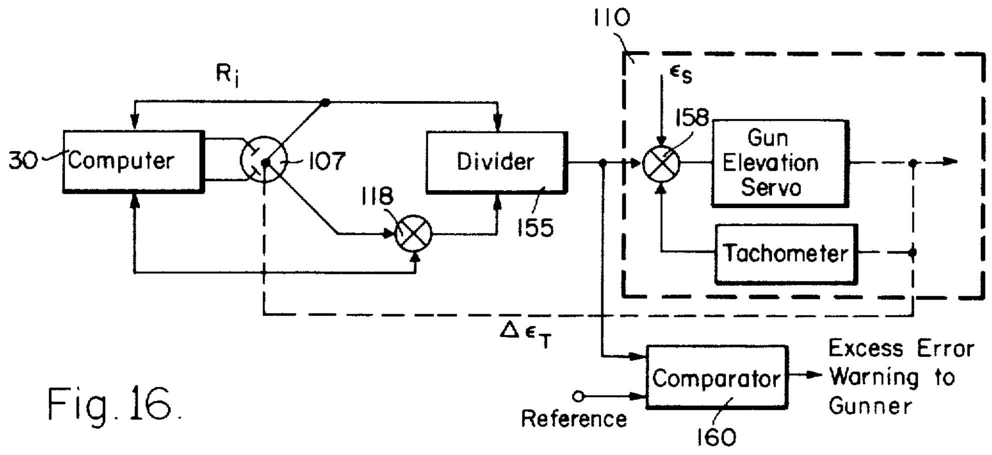
FIG. 16 is a block diagram of the gun elevation axis servo control.

A block diagram of the gun elevation axis control is shown in FIG. 16. Inputs to the gun elevation axis resolver 107 are generated in computer 30. One of the resolver outputs is summed with the superelevation correction by adder 118 and sent as a position error command to the gun elevation servo 110 via divider 155 which is in fact also physically packaged in computer 30. Adder 158, which sums in a feedback signal from tachometer 159, is a part of gun servo 110. When the error signal to the servo 110 is driven to null by the gun elevation servo, the other output of resolver 107 is proportional to the term $R_i$. This is then fed back to the computer 30 to complete the implicit solution for the lead angle equations.

Although the position error is driven to null, its sensitivity varies with predicted range to intercept, $R_i$. By dividing the error signal by $R_i$ in divider 155, the scale factor can be maintained at a constant value. This makes it possible to control the overall servo performance within narrower limits. Additionally, the error signal, $\Delta\epsilon_T$, is applied as one input to a comparator 160 which has a fixed reference voltage as its other input. The reference voltage is preferably scaled to a fixed maximum error of the order of three milliradians so that an output is produced from comparator 160 whenever this value is exceeded. The output signal from comparator 160 may be used to provide a display signal of any suitable type to the gunner. For example, the light which backlights the reticle in the gunner's sight unit can be changed from white to red by the signal output from the comparator 160 in order to indicate to the gunner that he is off target by an excessive amount.

As shown in FIG. 16, another command which is applied as input to the summer 158 and applied thence to the elevation axis control servo is the elevation rate of the sight line. This signal is nearly equal to the value theoretically required for the gun elevation rate. The differential rate error is easily made up by adjusting the gain of the position error circuitry so that the total tracking error is reduced to an acceptable minimum vale at the most extreme combination of input commands (a typical error figure is 0.5 mr error at a command rate of 1500 mr/sec).

Figure 17:
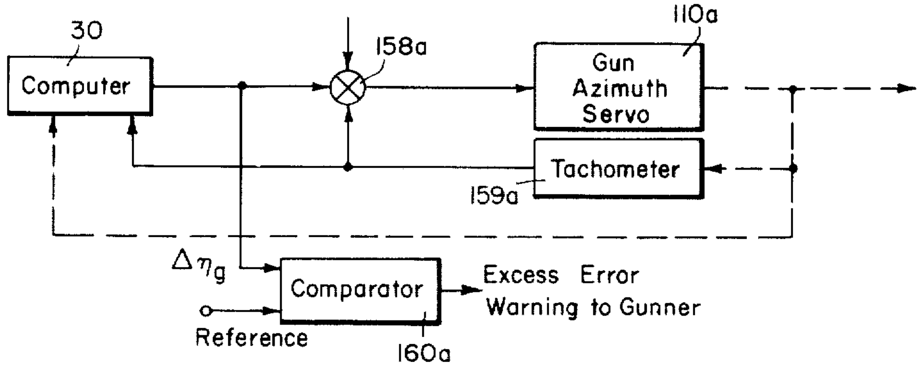
FIG. 17 is a block diagram of the gun azimuth axis servo control.

In FIg. 17 there is shown a block diagram of the gun azimuth axis control. This loop is similar in operation to that of the elevation loop except that the resolver is actually driven the sight servo. Elements corresponding to the elements shown in FIG. 16 are identified in FIG. 17 by the same reference characters with the letter *a* added.

Considering finally the operation of the system as a whole, its basic philosophy and salient features may be highlighted as follows. The mechanization employs a director or nondisturbed sight. This makes it easier for the gunner to aim his line of sight at the target and avoid perturbations produced by the gun servos. The problem logically divides into several parts. In the first part, the problem faced by the gunner is that of keeping the line of sight on a possibly rapidly moving target. Hence the first part of the solution is to supply to the gunner a tracking aid which relieves him of much of this problem. Since the mechanization requires that the lead angles be computed from the position of the line of sight, any additional aided tracking which makes it easier for the gunner to put and/or keep the line of sight on the target will enhance the accuracy of the total system. However, note that the mechanization is so arranged that it is not necessary for the aided track to function in order for the lead angle computer to function. The gunner can, for example, manually acquire the target, manually aim his line of sight, and still have the computer compute the requisite lead angles. The aided tracking is only, as the name implies, an aid to make it easier for the gunner to do his task.

The system as described shows how the total problem of firing a gun at a moving target is to be solved. Note that the system is really divided into two parts, the lead angle computation (which includes all the necessary inputs to point the gun at the target) is provided for in the computer. Inputs on which the lead angle computations are based are derived from the positioning of the gunner's line of sight. The gunner's line of sight is separately handled, first manually by the gunner and secondly with the computer aided tracking. The aid makes it much easier for the gunner to track a rapidly moving target although, as noted, it is not necessary for the aid to function in order for the lead angle computation to function.

There are several distinct and separate features in the tracking aid. The first mode as described previously in detail provides a rate command to the gunner's sight line in two axes to turn this at the proper nonlinear rates so that he can track the constant velocity vector target. The mechanization as shown takes advantage of the fact that a constant velocity vector target will actually be a constant velocity vector regardless of what coordinate frame it is measured in. We start out measuring the target in the RED system and then determine vector components in an inertial system. When we switch to aided tracking we feed the same saved or stored inertial components back and in effect bootstrap in through resolvers on the gunner's sight to provide self generation of the nonlinear trigonometric terms. Another feature of the tracking aid is a quadrant track mode. This removes any drift due to error accumulation within the computer or to a maneuvering target and so minimizes the gunner's task. Note that the quadrant tracker cannot function until the target is actually acquired.

Conventional practice for lead angle computation has been to provide an explicit solution from which direct pointing commands are sent to the gun control. This requires considerably more circuitry and is a more complex solution. In this mechanization the gun servo is made of the computation loop and the three equations relating lead angle to measured quantities are simultaneously solved as a set. The implicit solution is generated when the gun elevation axis is actually pointed in the correct direction. At this point, as indicated in the previous discussion, when one axis of the resolver is correctly nulled to supply the $\epsilon_T$ pointing term as indicated by a zero of small value of the $\Delta\epsilon_T$ error signal, the other resolver output winding provides the range to intercept voltage $R_i$ which is then fed back to the input to computer 30 to close the loop on the calculation.

What is claimed is:

1. In a gun fire control system, a gunner's sight comprising:

a. first and second telescopic optical paths, said first path having a field of view which is wider than said second path and having a magnification that is lower than said second path, b. both of said paths including common biocular members for said gunner and a common gimbal mounted mirror as its output member;

c. said second path including means for transmitting and receiving a laser beam along a portion of said path which includes said gimballed mirror and excludes said biocular members;

d. each of said paths including sight defining reticle means, the reticle for said first optical path having an inner circle which defines the total field of view avialable from said second path, and the reticle for said second path having an inner circle equal in diameter to the diameter of said laser beam.

* * * * *